US005550976A

United States Patent [19]
Henderson et al.

[11] Patent Number: 5,550,976
[45] Date of Patent: Aug. 27, 1996

[54] DECENTRALIZED DISTRIBUTED ASYNCHRONOUS OBJECT ORIENTED SYSTEM AND METHOD FOR ELECTRONIC DATA MANAGEMENT, STORAGE, AND COMMUNICATION

[75] Inventors: Kenneth R. Henderson; Robert E. Koski; Christopher R. Barlow, all of Sarasota, Fla.

[73] Assignee: Sun Hydraulics Corporation, Sarasota, Fla.

[21] Appl. No.: 986,727

[22] Filed: Dec. 8, 1992

[51] Int. Cl.$^6$ .................. G06F 13/00; G06F 13/14; G06F 17; G06F 30
[52] U.S. Cl. ............. 395/200.06; 395/600; 364/DIG. 1; 364/229; 364/242.94; 364/256.8; 364/282.1; 364/282.4; 364/283.3; 364/285; 364/285.3; 364/286; 364/DIG. 2; 364/962; 364/962.1; 364/962.4; 364/963; 364/963.1; 364/963.2; 364/963.5; 364/966.1; 364/966.5; 364/974; 364/974.2
[58] Field of Search ...................... 395/600, 200

[56] References Cited

U.S. PATENT DOCUMENTS

| | | | |
|---|---|---|---|
| 5,021,989 | 6/1991 | Fujisawa et al. | 395/600 |
| 5,093,911 | 3/1992 | Parks et al. | 395/600 |
| 5,167,035 | 11/1992 | Mann et al. | 395/575 |
| 5,168,565 | 12/1992 | Morita | 395/600 |
| 5,220,516 | 6/1993 | Dodson et al. | 366/514 |
| 5,247,638 | 9/1993 | O'Brien et al. | 395/425 |

OTHER PUBLICATIONS

Microsoft's "Windows For Workgroups"—Cowart, *Mastering Windows 3.1*, 1992 pp. 883–907.

Rymer, John R., "Common Object Request Broker: OMG's new standard for distributed object management," *Patricia Seybold's Network Monitor*, Sep. 1991, vol. 6, No. 9, p. 3; Document #11 441 646.

Rooney, Paula, "PC document management catches eye of big business," *PC Week*, May 18, 1992, vol. 9, No. 20, p. 45(2); Document #12 155 424.

"Documented success: data without management=chaos," *Information Week*, Sep. 23, 1991, No. 339, p. S1(11); Document #11 330 925.

Perratore, Ed; Salemi, Joe; Berline, Gary; Perez, Wendy Dugas, "Document management software: a network under control," *PC Magazine*, Dec. 17, 1991, vol. 10, No. 21, p. 287(18); Document #11 485 774.

"Digital's solution for engineering document management: DECedms," *Digital Review*, Jan. 20, 1992, vol. 9, No. 2, p. 42(1); Document #11 879 167.

Edelstein, Herbert A., "Document image management," *DBMS*, Apr. 1991, vol. 5, No. 4, p. 46(5); Document #12 017 346.

(List continued on next page.)

*Primary Examiner*—Thomas G. Lee
*Assistant Examiner*—D. Dinh
*Attorney, Agent, or Firm*—Jacques M. Dulin; Frederick J. Zustak

[57] ABSTRACT

A highly secure, virus resistant, tamper resistant, object oriented, data processing system for depositing, withdrawing and communicating electronic data between one or more individual and/or networked computers comprising one or more computers for processing electronic data including one or more shared electronic storage devices for the temporary and/or permanent storage of said electronic data, each of said computers including custom configurable system programs for asynchronous depositing, withdrawing and communicating said electronic data to commonly shared electronic storage devices, and said programs permitting data archival, accountability, security, encryption and decryption, compression and decompression, and multi-processing capabilities.

21 Claims, 8 Drawing Sheets

Microfiche Appendix Included
(1 Microfiche, 25 Pages)

OTHER PUBLICATIONS

Brooks, Roseann McGrath, "I is for image: keyword adds compound document image objects to its document interchange software," *DEC Professional*, Jan. 1992, vol. 11, No. 1, p. 28(1); Document #11 744 066.

"Imaging technology: how to achieve information process control," *Datamation*, Mar. 1, 1992, vol. 38, No. 5, p. S1(11); Document #11 990 034.

"Documenting the challenge in today's manufacturing environment," *Digital Review*, Jan. 20, 1992, vol. 9, No. 2, p. 41(1); Document #11 879 163.

Biehl, Allen, "Text retrieval software: tools for electronic pack rats," *WordPerfect Magazine*, May 1992, p. 54(5); Document #12 162 107.

"Text retrieval: new document analysis and text retrieval system," *EDGE: Work–Group Computing Report*, Mar. 30, 1992, vol. 3, No. 97, p. 22(1); Document #12 033 446.

Marshall, Patrick, "Text retrieval; InfoWorld looks at how well five packages fetch your words," *InfoWorld*, Mar. 23, 1992, vol. 14, No. 12, p. 77(10); Document #12 015 572.

"Capacity, flexibility, and speed count for a lot when scoring text retrieval software," *InfoWorld*, Mar. 23, 1992, vol. 14, No. 12, p. 80(1); Document #12 016 444.

Marshall, Patrick, "Folio Views 2.1," *InfoWorld*, Mar. 23, 1992, vol. 14, No. 12, p. 82(3); Document #12 015 636.

Marshall, Patrick, "InfoQue 2.0," *InfoWorld*, Mar. 23, 1992, vol. 14, No. 12, p. 82(3); Document #12 015 734.

Marshall, Patrick, "Sonar Professional," *InfoWorld*, Mar. 23, 1992, vol. 14, No. 12, p. 83(3); Document #12 016 170.

Marshall, Patrick, "ZyIndex 4.02," *InfoWorld*, Mar. 23, 1992, vol. 14, No. 12, p. 83(3); Document #12 016 304.

Appleton, Elaine L., "Smart document retrieval," *Datamation*, Jan. 15, 1992, vol. 38, No. 2, p. 20(4); Document #11 908 787.

Myers–Tierney, Linda, "An introduction to text management; a guide for the office user," *Patricia Seybold's Office Computing Report*, Oct. 1991, vol. 14, No. 10, p. 8(11); Document #11 475 824.

"Excalibur's PixTex: a retrieval alternative; pattern recognition approach being combined with page–image retrieval," *The Seybold Report on Publishing Systems*, Mar. 25, 1991, vol. 20, No. 13, p. 36(3); Document #10 613 165.

Miles, J. B., "Keyfile: A distributed processing breakthrough?," *Government Computer News*, Apr. 27, 1992, vol. 11, No. 9, p. 39(1); Document #12 186 881.

Kador, John, "Searching for text retrieval," *Database Programming & Design*, Nov. 1991, vol. 4, No. 11, p. 62(4); Document #11 485 978.

Mallory, Jim, "Thaumaturgy intros electronic document indexing program," *Newsbytes*, Feb. 18, 1992; Document #11 950 697.

"ZyIndex for Windows (V.5.0)," *Data Sources Report* Copyright Ziff–Davis Publishing Co. 1993; Document #Software Product Specification.

Moser, Karen D., "Binary large object technology bolsters Paradox for Windows," *PC Week*, Oct. 21, 1991, vol. 8, No. 42, p. 4(1); Document #11 428 597.

"Rushmore's bald spot," *DBMS*, Sep. 1991, vol. 4, No. 10, p. 58(1); Document #11 203 423.

Bowen, Ted Smalley, "Process manufacturing sites gain CDA–based data management," *Digital Review*, Jan. 6, 1992, vol. 9, No. 1, p. 9(1); Document #11 687 778.

Orfali, Robert; Harkey, Dan, "The BLOBs are coming: move monster–size images across a LAN with standard protocols," *LAN Technology*, Jan. 1992, vol. 8, No. 1, p. 61(6); Document #11 644 180.

Walter, Mark, "Compound documents: interchange and intergration," *The Seybold Report on Desktop Publishing*, Jul. 22, 1991, vol. 5, No. 11, p. 10(16); Document #11 049 938.

Jenkins, Avery L., "Manufacturing software displays systems as objects," *Digital Review*, Nov. 18, 1991, vol. 8, No. 35, p. 21(1); Document #11 568 202.

Frye, Colleen, "Document management tools respond to drive onto LANs," *Software Magazine*, Aug. 1991, vol. 11, No. 10, p. 76(5); Document #11 099 255.

Mann, Janet, "An image of document management," *Datamation*, Nov. 15, 1991, vol. 37, No. 23, p. 81(2); Document #11 511 788.

McGoveran, David, "The origin of the server species: Can file servers evolve into database servers . . . or vice versa?," *LAN Technology*, Jun. 1992, vol. 8, No. 6, p. 59(8); Document #12 173 632.

Zurek, Bob, "Help, my server failed!," *Data Based Advisor*, Oct. 1991, vol. 9, No. 10, p. 90(4); Document #11 385 761.

Thomas, Larry J., "The distributed management choice: picking a LAN management protocol can bear fruit quickly if you choose carefully," *LAN Technology*, Apr. 1992, vol. 8, No. 4, p. 53(10); Document #12 009 244.

"Electronic delivery of documents: when paper just can't do the job," *The Seybold Report on Desktop Publishing*, Dec. 1, 1991, vol. 6, No. 4, p. 38(4); Document #11 679 714.

Higgins, Steve, "XcelleNet to boost forms–routing tool: will rename X/RAM family of WAN applications," *PC Week*, Apr. 20, 1992, vol. 9, No. 16, p. 16(1); Document #12 079 746.

Edelstein, Herbert A., "Imaging shifts emphasis to workflow management; document imaging systems promise productivity, and opportunity for 'business process design'," *Software Magazine*, Nov. 1991, vol. 11, No. 13, p. 96(5); Document #11 523 113.

Pridding, Bob, "Dealing with huge databases requires change in thinking," *Computing Canada*, Aug. 15, 1991, vol. 17, No. 17, p. 29(1); Document #11 205 981.

Rhodes, Mary E., "Viewpoint: database vendors in document management," *New Science Report on Strategic Computing*, Mar. 1991, vol. 1, No. 3, p. 4(1); Document #10 629 880.

DECENTRALIZED DISTRIBUTED ASYNCHRONOUS OBJECT ORIENTED SYSTEM AND METHOD FOR ELECTRONIC DATA MANAGEMENT, STORAGE, AND COMMUNICATION

CROSS REFERENCES

Reference is made to a microfiche appendix containing 1 microfiche and 25 total frames. The microfiche portion of this patent document contains material subject to copyright protection. The copyright claimant has no objection to a single facsimile reproduction by anyone of the patent document or the patent disclosure, as it appears in the United States Patent and Trademark Office patent files or records for the purpose of obtaining a full record of the patent document, but otherwise reserves all copyrights whatsoever in and to the work.

FIELD

The invention relates to electronic data management systems, and more particularly to a computerized system and method for asynchronous storage, retrieval, and communication of electronic data on a peer to peer basis, which system is: a) compatible with individual computers and networked computers; b) has a high degree of data security; and c) is particularly useful in providing a universal means for common storage, retrieval, and communication of electronic data.

BACKGROUND

A primary and vital aspect of existing computerized electronic data management, storage and communication systems and methods, particularly network systems, is a common data storage unit which is accessible by all users on a synchronous basis for storage, retrieval, and communication of data. The synchronous nature of these systems poses numerous problems.

One such problem is that to prevent simultaneous access to the same record, i.e., the same physical space on the data storage and retrieval device, software programmers must incorporate file, record, or field locking means into the software which prevent the writing and reading to the same record at the same time. This vastly complicates the writing of the software and functionally slows access time.

Another serious disadvantage of synchronous electronic data management, storage, retrieval and communication systems is that the system may "lock-up" rendering the common data storage and retrieval device inaccessible and unusable until the system is restored to its operable state. Because most network systems are dependent on "sending" information to a computer that is assumed to always be on-line to receive the information, lock-up may occur when: a) computers in the network go off-line or come on-line without proper logging-on or logging-off procedures; or b) an individual computer crashes or its power fails; or c) the operator inadvertently terminates the network communications program to run an applications program. These are just a few of the many ways in which individual computers linked in a network can go off-line, causing the entire network communications to lock-up. And because most network systems cannot easily share information with other networks of differing protocols, users tend to move to bigger and bigger network systems. The bigger the network, the worse the lock-up problem.

Another problem is that there is no universal method to store data in a common data storage and retrieval device from the many different applications programs, nor is there any way for multi-tasking applications to share information in an asynchronous manner and at the same or near real time.

Another problem is the integrity of the data when passed from computer to computer or from network to network. Most network systems cannot assure complete transmission of data. It is particularly difficult to pass data between different networks, especially if the network systems use differing protocols.

Another problem is user tracking. User entry and exit trails are extremely hard to reconstruct after there has been any access, authorized or unauthorized, to the common data storage and retrieval device.

Another severe problem of a common data storage and retrieval device is that it is susceptible to user tampering or virus infection, both of which can result in altered, scrambled or deleted data. The susceptibility of user tampering and viral infection often requires elaborate and expensive countermeasures such as password systems and anti-viral software.

Another problem is that data cannot be transmitted between networked computers in encrypted form.

Another problem is that most network systems require a computer having large computing power and a large capacity data storage device to act as dedicated host or server to run the network operating programs. Then, individual workstations or computer stations ("clients") must be hard-wired to the server. In addition, with many client-server based systems, two different types of computer programs are required, one for server operations and one for client data manipulation. This further complicates the writing of programs and slows access time.

Accordingly, there is a need for a computerized system for the management, storage, retrieval and communication of electronic data that is asynchronous in nature and which system overcomes the inherent problems associated with the existing synchronous systems as described above.

THE INVENTION

TERMS

It is to be understood that any reference to the below listed terms shall have the corresponding meaning provided:

Asynchronous is used in its common industry sense; including without limitation, plural activities which take place independently of the other, each activity not having to wait for any other activity to be complete to proceed.

Object: means any binary data file, including but not limited to, documents, programs, graphics, voice mail, faxes, Computer Aided Design (CAD) files, and Binary Large Objects (BLOB's), and the like, as they are traditionally and broadly understood, as well as any other object that is desired to be written to a data storage device, area, or location. In the disclosure herein, reference to data storage device, area, or location or the act of reading or writing may interchangeably refer to "in" or "on". Thus, "writing on" or "writing in" means the same.

Temporary Object: means an object having an expiration date; i.e., in-process objects which are stored temporarily in the electronic data storage means of an ObjectBank System.

Permanent Object: means an object having no expiration date; i.e., an object that will be stored forever on an electronic data storage device compatible with an ObjectBank System.

ObjectSafe: means a specified physical data storage area of a data storage device including, but not limited to, hard disks, floppy disks, magnetic tape, magnetic drum, bubble memory, stringy tape, digital audio tape ("DAT"), VCR tape, laser disks, magneto-optical disks, CD-ROMs, and laser cards.

ObjectVault: means a dedicated computer having an ObjectSafe which has sufficient data storage capacity to store all objects of all ObjectSafes on the ObjectWire Network.

ObjectTeller: means an OLE-aware and OLE-accessible computer program having user customizable function means to deposit and withdraw ("retrieve") objects to and from ObjectSafes and to conduct status checks of deposits and withdrawals.

ObjectWire: means a computer program having user customizable function means for communications, i.e., polling and retrieving objects, from other individual or networked computers each having an ObjectWire program.

ObjectWire Network: means the architecture of all computers compatible with an ObjectBank System, i.e., any one or more computers linked together by having an ObjectTeller and ObjectWire program installed.

ObjectBank System: means any one or more computers having installed an ObjectTeller and ObjectWire program and a system architecture configuration comprising an ObjectSafe and/or ObjectVault, MED, Out Box, and optionally, a MailBank and JobBank. A computer having an ObjectBank System may be referred to as an ObjectBank System computer.

Message Exchange Database ("MED"): means a defined physical electronic data storage area of an ObjectSafe or ObjectVault accessible via the ObjectTeller program or other OLE-aware application program for the purpose of depositing and withdrawing temporarily stored objects for the purposes of communicating messages requesting an object be stored in a target ObjectSafe or ObjectVault or requesting an object be retrieved from a target ObjectSafe or ObjectVault.

ObjectBank Manager: means a specified user responsible for the operation, care and maintenance of a computer or computer network having an ObjectBank System.

MailBank: means an electronic data storage area ("mailbox") of an ObjectSafe for the asynchronous depositing and withdrawing of electronic objects ("mail") by one or more ObjectBank System computers on an ObjectWire Network.

JobBank: means an electronic data storage area of an ObjectSafe for the posting of one or more objects, i.e., applications program run commands or "jobs" (typically, by way of example, a process-bound application) to be retrieved and executed by an idle computer on the ObjectWire Network.

Out Box: means a temporary electronic data storage area of an ObjectSafe for the posting of objects via the ObjectTeller program to be retrieved and stored to one or more other computer's ObjectSafes or ObjectVault on the ObjectBank Network.

Index Card ("IC"): means a permanently stored customizable and modifiable electronic index data file of every object of the ObjectBank System having the following data fields: object type, date/time, IC identification code, parent IC identification code, created by, key words (four), abstract, object source path; and, each index data file having user selected features for data encryption, data compression, password access, public or private list access, and IC visibility.

Index Card Template: means an electronic template or "mask" having a default configuration of an uncompleted or "blank" Index Card and which template is user customizable and which default or customized template is used for the creation of an object Index Card.

OLE: means "object linking and embedding" as is commonly known in the field of the art.

OBJECTS

It is among the objects of this invention to provide an improved computerized system and method for electronic data management, storage, retrieval and communication of objects which is asynchronous in operational nature.

It is another object of this invention to provide an improved computerized system and method for electronic data management, storage, retrieval and communication of objects which operates on a peer to peer basis.

It is another object of this invention to provide an improved computerized system and method for electronic data management, storage, retrieval and communication of electronic objects which has attributes of being robust, tamper resistant, highly data secure and virus resistant.

It is another object of this invention to provide an improved computerized system and method for electronic data management, storage, retrieval and communication of objects on one or more electronic data storage devices and which system is compatible with a wide variety of currently available communication programs and network systems.

It is another object of this invention to provide a computerized system and method for electronic data management, archival storage and retrieval of objects in an historical, sequenced manner, which system does not permit writing over previously stored objects.

It is another object of this invention to provide a computerized system and method for electronic data management, storage, retrieval and communication of objects in encrypted and/or compressed form.

It is another object of this invention to provide a computerized system and method for electronic data management, storage, retrieval and communication of objects having as an important feature a multiple electronic index record system for accountability of all object transactions and rapid searching, tracking, and accessing of all objects on the ObjectBank Network.

It is another object of this invention to provide an improved computerized system and method for electronic data management, storage, retrieval and communication of objects which system is not subject to lock-up.

It is still another object of this invention to provide a computerized system and method for electronic data management, storage, retrieval and communication of objects which system has a unique program for the deposit, retrieval, and determining of the status of objects from an electronic data storage device.

It is still another object of this invention to provide a computerized system and method for electronic data management, storage, retrieval and communication of objects which system has a unique program for the polling and retrieval of objects from an electronic data storage device.

It is still another object of this invention to provide a means for application programs to share objects, including transactions and electronic mail, in an asynchronous secure manner.

It is still another object of this invention to provide a means for computers to divide work and simultaneously process applications programs or portions of the same applications program.

It is still another object of this invention to provide a means for individual or networked computers to share objects on a peer to peer basis without having to be hard-wired.

Still other objects will be evident from the specification, drawings, and claims.

DRAWINGS

The invention is described in more detail by reference to the drawings in which.

SUMMARY

Figure 1:
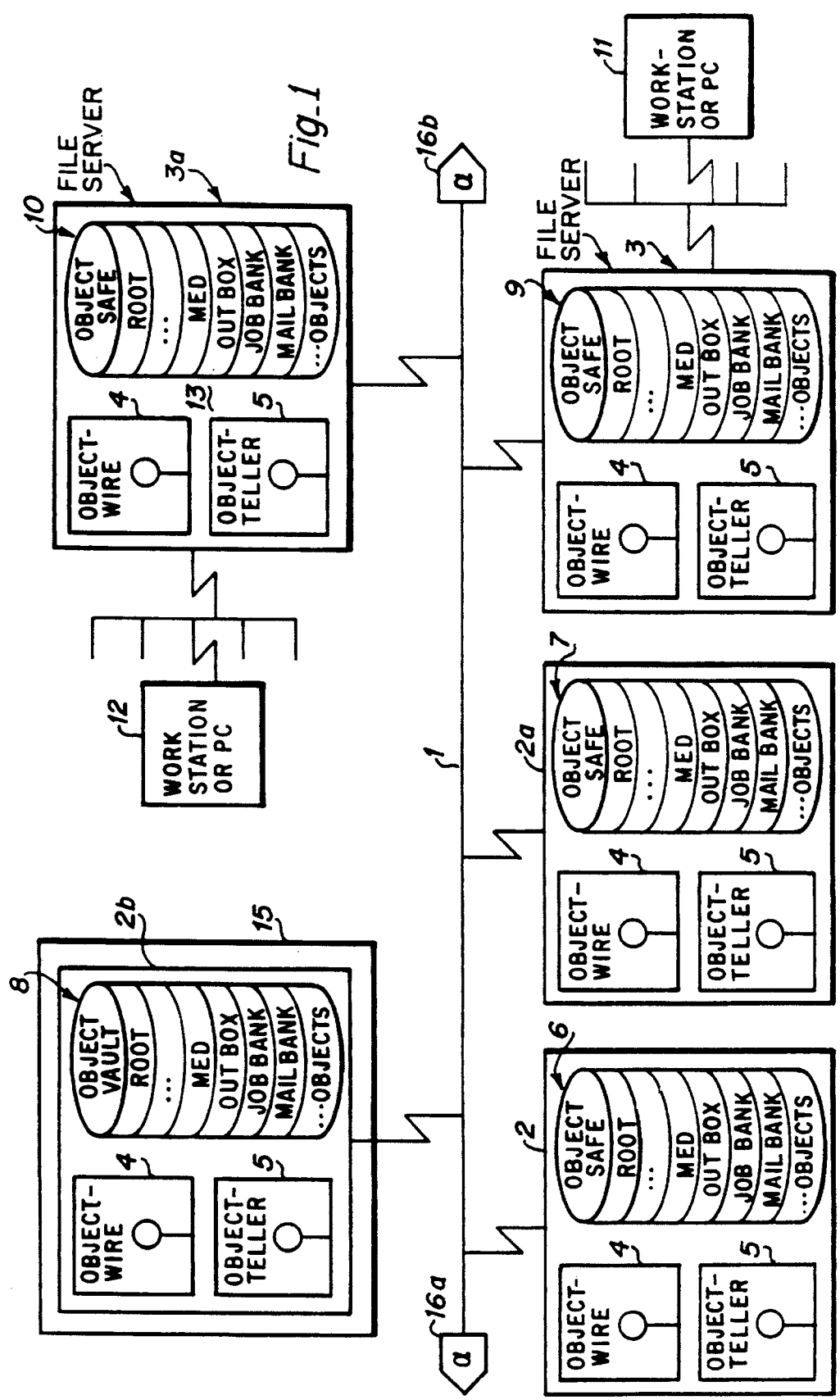
FIG. 1 is a schematic diagram of the architecture of a plurality of computers having an ObjectBank System of the invention comprising an ObjectWire Network configuration.

The invention is directed to an asynchronous electronic data management, storage, retrieval and communication system and method compatible with any multi-tasking operating system. The overall system is called an "ObjectBank System." The ObjectBank System comprises a user interface program called the "ObjectTeller" program, a communications program called the "ObjectWire" program, (both programs written in "C" language and capable of being written by one skilled in the art of computer programming), and computer system architecture including a standard industry computer processor, input/output devices and at least one primary defined physical data storage area for "objects" called the "ObjectSafe" or "ObjectVault." Objects can be any type of binary data file. Each object is index referenced by use of electronic "index cards" and stored in an Object-Safe for retrieval upon request using the ObjectTeller Program and communication among computers by the ObjectWire Program. All Permanent Objects of all Object-Bank System computers on the ObjectWire Network may be stored in an archival ObjectSafe which is then called an ObjectVault. There is no physical difference between an ObjectSafe and an ObjectVault other than an ObjectSafe permanently stores select objects whereas an ObjectVault permanently stores all objects from all ObjectSafes on an ObjectWire Network.

Objective of the System Invention

The objective of the ObjectBank System is to provide a method means for electronic data management, storage, retrieval and communication of data stored in a universally compatible ASCII format in at least one central storage device (ObjectSafe or ObjectVault) and shared in an asynchronous manner on a peer to peer basis with other Object-Bank System computers. Each object in the ObjectBank System is indexed and stored to a user selected target ObjectSafe and/or ObjectVault. Once stored, objects are never modified, overwritten or deleted, but are only copied and the copies shared with other users. Objects are shared between users by message request using a Message Exchange Database ("MED"). Upon the message request by other users for the sharing of a particular object (or all objects) from a specified (or all computers) on the Object-Bank Network, the ObjectBank Manager of the target ObjectSafe copies the requested object(s) and places the object(s) in an "Out Box" for "pick-up" (transmission) via the ObjectWire program by the requesting users. Since objects are only copied from the ObjectSafe or ObjectVault, the stored objects are guarded against any modification or tampering and the ObjectSafe and/or ObjectVault is protected against virus infection because no object stored is ever "run" which execution would typically provide the mechanism for infection by or replication of a virus. The ObjectBank System may also provide data protection by periodically reminding the ObjectBank Managers to permanently store their important Temporary Objects and delete multiple copies of Temporary Objects. The ObjectBank System is specially designed to pass information between computers on the ObjectWire Network with near 100% accuracy. An Index Card for each object maintains at least one sequential, historical trail of its origin. Thus, each object's Index Card will have a reference record of its origin and of the "family tree" of related objects, i.e., the physical addresses of each parent and child of an object. Thus, Index Cards help speed access to objects, record a trail of copies of objects that are deposited or retrieved, record who made the deposits or requests, and record what other ObjectBank System computers have copies of objects and Index Cards. Like any other Permanent Object, completed Index Cards are stored in the ObjectSafe or ObjectVault and copies may be made and transferred to other users on the ObjectWire Network.

Interconnectivity of the System Invention

The ObjectBank System of this invention is particularly adapted for use with computers which may be linked via modem or network using currently available network programs, such as Lantastic and Novell. To be compatible with the ObjectBank System, however, each stand alone computer or each networked computer system requires its own ObjectTeller and ObjectWire programs. Together, the ObjectBank System computers comprise an ObjectWire Network. Communications between computers on the ObjectWire Network is on a "receive alone" basis, i.e., there is no "sending" of any data or object to a target address. The ObjectWire program is configured by a user to look for and request certain types of objects by designated search criteria. The ObjectWire program time sequentially "polls" via modem or network a Message Exchange Database ("MED") of other ObjectNetwork computers for the designated type of object fitting the search criteria. If the designated type of object is made available for copying by a ObjectBank Manager, i.e., placed in an Out Box, it is transmitted to the requesting user by the requesting user's ObjectWire program. Because each computer of the ObjectBank System only receives only copies of objects made available by other users on the ObjectWire Network, there is no "sending" of data and therefore no mechanism to cause the ObjectBank System to lock-up. Thus, computers which remain on the ObjectWire Network can continuously receive available (stored) objects and in any order from any computer system which remains on the ObjectWire Network. If any computer goes off the network through a power outage, computer hardware or software defect, user error, the ObjectBank System of operation is not affected. Each ObjectBank System compatible computer will continue to poll for requested objects and hold any object retrieval or storage requests until the target computers are reconnected.

Computers in the ObjectWire Network can be interconnected via modem, Local Area Network (LAN) which involves linkage of in-house computers, or Wide Area Network (WAN) which involves networks linked to other networks. The ObjectWire program has the capability to log on sequentially to successive networks using different network software and protocols, and to process the respective storage and retrieval message requests. Because objects are "picked up" by the ObjectBank System rather than "sent," the system of this invention is particularly conducive to an architecture wherein the ObjectBank System connects to multiple networks sequentially and picks up from each Message Exchange Database (MED) any storage or retrieval message requests to perform on that network or pass along to an ObjectSafe on another network before disconnecting and connecting to the next network. This allows users to share objects easily in an asynchronous manner among several non-compatible network systems.

Rules of the System and Method Invention

Two basic rules of the ObjectBank System and method apply: First, no computer may write to any storage device of any other computer on the ObjectWire Network. Second, permanently stored objects are never modified, over-written or deleted. Therefore, only copies of stored objects are ever transmitted to other computers on the ObjectWire Network.

Encryption and Compression of Objects

For data security and efficiency of operation, object encryption and compression may be employed. In the best mode of operation, the default configuration of the ObjectTeller program is to encrypt and compress all objects for permanent storage as well as transmission to other users via the ObjectWire program. However, the ObjectBank Manager has the option of specifying that a particular object or all objects not be encrypted or compressed.

Access Authorization

In addition to object encryption and compression, the ObjectBank System maintains a multi-leveled access authorization structure for users, messages, index cards, and objects. When the user accesses the ObjectBank System, the user's identification code and password is verified by the ObjectTeller Program to determine whether that user is authorized to access the object stored in that ObjectSafe. The ObjectTeller configuration files include the list of authorized users to store and/or retrieve all or particular objects. Modifications to the list are appropriately protected so that only authorized persons (e.g., the ObjectBank Manager) can add or delete user names. There are three levels of access to objects:

(1) if the object is available for anyone on the ObjectWire Network to copy, then the access is "Public";

(2) if there is a distribution list of authorized users to particular objects, then the access is "Restricted"; and (3) if there is only the original user on the authorization list, then the access is "Private."

Index Cards

All ObjectBank System transactions are recorded on an object reference Index Card which is created automatically when an object is stored to an ObjectSafe or ObjectVault. Index Cards provide a rapid reference classification means for retrieval of objects from an ObjectSafe or ObjectVault. Index Cards also provide a means for determining the genealogy of object requests, storage, and retrievals. In addition, Index Cards provide the means by which the user determines: (1) whether or not the object is to be encrypted and/or compressed; (2) the password; (3) the access level (i.e., public, restricted, or private); (4) the access list of authorized users; (5) whether or not the Index Card will be "visible" (i.e., displayed) to other users; (6) up to four "key words" of the object to be used as index search terms; and (7) an abstract (summary) of the subject content of the object.

Each ObjectBank System keeps its own set of Index Cards and records, in date/time sequence, of all requests for objects, all retrievals obtained or denied, all deposits offered and/or accepted by the ObjectSafe. The ObjectBank System maintains indexes to help speed access to its objects, to record a trail of copies of objects that are deposited or retrieved, to record who made the deposits or requests, and to record what other computers have copies of objects and indexes. In addition, users may create via an Index Card Template additional reference Index Cards of the object, such as: WordPerfect documents by "Author" and "Subject"; Lotus files by the contents of cell "A1"; Dbase files by "Field" within "Record"; CAD files by "Changed-By," etc. A user may build Temporary Index Cards of his and other user's objects for a specific search. By way of example, a "fuzzy" search may be conducted by searching for certain key words on Index Cards. In addition, searches may be made directly of the objects in the ObjectSafes, if the Index Card information is not complete or sufficient.

Index Cards of the users objects are stored in the users ObjectSafe. Index Cards of objects stored on other ObjectSafes may be also be stored if selected by the user. Typically, the user's computer ObjectSafe has more limited storage space and the user will not want to store all Index Cards from all the ObjectSafes. The user can configure his ObjectBank System to keep only selected Index Cards related to specific topics. However, if the user wishes to see other types of Index Cards, he can configure the ObjectWire program to request and retrieve Index Cards relating to a particular subject from other ObjectSafes.

Like all objects, all Index Cards for all ObjectSafes on the ObjectWire Network may be stored in the ObjectVault. Index Cards are never deleted. If they are updated, the prior Index Cards are always available for review. Periodically, Temporary Index Cards are stored as Permanent Objects is an ObjectVault for safekeeping.

Configuration of the Object Bank System

An ObjectBank System is configured via both the ObjectTeller program and the ObjectWire program. The Object- Teller program contains configuration routines used to install and configure the ObjectBank System on each computer and to create an ObjectSafe or ObjectVault. The configuration process includes the steps of:

1. Assigning a unique ObjectSafe Identification Code to the computer for use on the ObjectWire Network;
2. Designating storage rights, i.e. identifying whether this ObjectSafe will permit storage of either Permanent or Temporary Objects, both, or neither (in which case users could only access information stored in other ObjectSafes over the ObjectWire Network);
3. Setting which physical storage device(s) can be used as the ObjectSafe;
4. Setting the maximum size for the ObjectSafe;
5. Determining whether other users will be allowed to store objects in the ObjectSafe;
6. Assigning to the User List user identification codes, access levels and passwords which permit users to:
   a. retrieve from the ObjectSafe;
   b. retrieve from other selected ObjectSafes;
   c. store to the ObjectSafe;
   d. store to other selected ObjectSafes;
   e. perform "housekeeping functions"—including assigning at least one user as the "ObjectBank Manager" who will be capable of transferring Permanent Objects from the ObjectSafe, change access levels and user passwords, etc.;
7. Specifying the software and hardware configuration of the computer to provide other ObjectBank System users an indication of whether or not their computers can use a certain object;
8. Setting up the default Index Cards that will be used for the various types of objects that will be stored in the ObjectSafe and permit the user to build new default Index Cards; and
9. If this is the first time the ObjectBank System is used on the computer, the creation of hidden subdirectories and the verification of connections to the ObjectWire Network. The ObjectWire program also contains configuration routines which include the process of:
   1. Determining which Index Cards from other ObjectSafes will be stored in its ObjectSafe; and
   2. Specifying which other ObjectSafes shall and shall not be polled on the ObjectWire Network and the access method (e.g., network card, modem phone number, password, etc.).

Housekeeping Functions

There are a number of Housekeeping functions of the ObjectTeller program of the Objectbank System. These functions include the following:

1. Backup/Restore Objects. This function is used to backup the objects stored on the ObjectSafe to another storage device or to restore the objects stored on the ObjectSafe from another storage device.
2. Rebuilding Index Cards. This function is used to rebuild Index Cards from the original object stored in the ObjectSafe if the Index Cards have been corrupted. Certain Index Card information is written directly on the object as a header label when the object is compressed for storage in the ObjectSafe. This header information is sufficient to rebuild most of the Index Card if it is destroyed. This function is also used to build temporary indexes for a fuzzy search by a user; for example, searching all Index Cards or all objects for the phrase "cartridge valve" occurring within a search boundary of 10 words from the phrase "competitor". This function is also used to set up the default Index Cards that will be used by this ObjectSafe for various types of objects.
3. Move Objects to Other Physical Storage Devices. This function is used to move objects from one ObjectSafe to another or ObjectVault, to move objects from one physical storage location to another within an ObjectSafe, to move objects from Temporary to Permanent storage, or to move objects to a "NULL" device. Upon the execution of a move operation, the object will no longer reside in the original source ObjectSafe location, although the Index Card will remain indicating that the object was in that ObjectSafe location and moved to another ObjectSafe location. Permanent Index Cards are never deleted and therefore there will always remain a record of the prior and subsequent locations of moved objects.
4. Deleting Objects.
   a. At any time a user may delete Temporary Objects from the ObjectSafe and suggest that Temporary Objects be deleted from other users ObjectSafes. Permanent Objects are never completely "deleted," but are moved to another storage device to free up storage space. The only method to actually, physically "delete" a Permanent Object from the ObjectSafe or ObjectVault is to purposefully move the object to a "NULL" device.
   b. The ObjectBank Manager may delete any user's Temporary Objects from the ObjectSafe and move any Permanent Objects to a NULL Device. There may be a different ObjectBank Manager for each ObjectSafe. If one or more ObjectVaults have been created, each ObjectVault must have at least one ObjectBank Manager who has physical access to the ObjectVault computer. An ObjectBank Manager or user may only perform these "delete" functions from the local keyboard attached to the ObjectSafe or ObjectVault computer when logged off the ObjectWire Network.
   c. Anytime that objects are deleted from an ObjectSafe, the Index Cards are updated with the information about the deletion. Even if Permanent Objects are "deleted" by moving the object to a NULL Device, Index Cards remain in the ObjectSafe as a permanent record of the object's prior existence.
5. Packing Objects After Deletions. When the object is moved from the ObjectSafe, the ObjectBank System will pack the remaining objects to optimize physical storage space usage.
6. ObjectBank System Start-up/Shut-down. The ObjectBank System programs contain a Start-up/Shut-down routine for entering and exiting the ObjectBank System (i.e., ObjectTeller and ObjectWire programs). The user may use this function to start-up or shut down the ObjectBank System completely, or just turn on or off selected functions of the ObjectBank System. Upon the execution of the routine, the ObjectWire Program will poll the Message Exchange Databases of other ObjectSafes on the ObjectWire Network to determine if there are any message requests or works-in-process.

Operation of the ObjectBank System Method

In typical operation, the ObjectBank System method of this invention functions as follows:

Depositing of Objects: When a user determines that an object is to be deposited ("stored") in a selected target ObjectSafe or ObjectVault, a user completes an Index Card identifying the object to be deposited. The Index Card is generated and completed by either executing the ObjectTeller program functions directly or indirectly through an OLE aware application program (which automatically executes the ObjectTeller program functions upon the execution of a certain application command such as "Save," for example). Once the Index Card is completed, the object is encrypted, compressed, and copied into the user's ObjectSafe. If the object is to be deposited to another users ObjectSafe or to an ObjectVault, the encrypted and compressed object is copied to the user's Out Box and a message request that the object be deposited in the target ObjectSafe or ObjectVault is placed in the user's Message Exchange Database. The object is left in the user's Out Box for pick-up ("copying") at some near future time by the target ObjectWire Program of the target ObjectBank System.

Each ObjectWire program of each ObjectBank System polls each Message Exchange Databases of the various computers on the ObjectWire Network. This polling may be on a regular, timed interval basis, or it may be done on a learned, frequency-of-use-basis. When an ObjectWire program detects a message request to deposit an object to its System's ObjectSafe or ObjectVault, it verifies that the user is authorized to store objects in its ObjectSafe or ObjectVault, then copies to its ObjectSafe or ObjectVault the object left for pick-up in the source user's Out Box. At that time, a running historic record is updated and put on an Index Card and placed in the target ObjectBank System's Out Box for pick up by the source of the message request and all other ObjectBank Systems. In this manner, all ObjectBank Systems are aware of all completed ObjectBank transactions.

Withdrawal of Objects: When an ObjectBank System user wants to withdraw ("retrieve") a particular object from an ObjectSafe or ObjectVault, the user executes the ObjectTeller Program withdrawal routine which produces an Index Search Card to be completed for the purpose of searching for and finding the desired object's Index Card. If Index Cards are to be searched on other ObjectBank System computer's, a retrieval request message directed to the target ObjectBank System is place in the Message Exchange Database for pick-up by the target System(s). The target ObjectBank System's ObjectWire program polls each Message Exchange Database, detects the request message, searches for the object Index Card requested, determines that the requesting user is authorized to retrieve the object, locates the object, makes a copy, places it in its Out Box for pick-up and places a message in its Message Exchange Database that it is ready for pick-up. The requesting user's own ObjectWire Program cyclically polls the target ObjectBank Systems Message Exchange Database. When the ObjectWire program detects that the object requested is in the target ObjectBank Systems Out Box for pick-up, it copies the object, decrypts and decompresses the object, and writes it to the designated ObjectSafe (either a file or in an OLE aware application file) where the user may then access and manipulate the object in whatever manner desired. Once the object has been successfully withdrawn ("picked-up\copied\retrieved") by the user, the Index Card of the object is updated and a successful retrieval message is placed in the Message Exchange Database. When the target ObjectWire Program sees the acknowledgement of the retrieval and that request message no longer exists, it updates the Index Card with the successful retrieval information. If the request message is not removed, the object stays in the target ObjectBank System's Out Box for a fixed period of time or until deleted by the ObjectBank Manager.

Note that during this process no computer has written to another computer's disk and there has been no tampering with the object that was originally stored because the user does not have access to the stored object. The user only works with copies of objects, and cannot access the ObjectSafe directly. The object is left in the ObjectBank Out Box until the user's ObjectWire Program picks up the copy. If the user's computer inadvertently goes off line through a power failure or computer crash, the transfer will not be affected. When the user's computer comes back on line, the user's ObjectWire Program can access the ObjectBank Out Box and pick up the object.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

This description is with reference to FIG. 1 which is a schematic of a plurality of computers 2, 2a, 2b, 3 and 3a each having an ObjectBank System of this invention and arranged in an exemplary ObjectWire Network 1 configuration. The ObjectWire Network 1 shows by way of example the capability of any computer having an ObjectBank System, whether a stand alone personal computer 2, 2a, 2bor networked computer 3, 3a, to share objects on an asynchronous, peer to peer basis with any other stand alone or networked computer on the ObjectWire Network 1 having an ObjectBank System. There is no limit 16a, b to the number of ObjectBank System computers which may connect to each other via modem, LAN, WAN or other connecting means and thereby comprise the ObjectWire Network 1.

Each ObjectBank System computer 2, 2a, 2b, and networked computers 3 and 3a of FIG. 1, comprises a standard industry computer having in addition to its operating system, peripheral input/output devices and applications programs, the "ObjectTeller" program 4 and the "ObjectWire" program 5, and an object storage device (6, 7, 8, 9 and 10), called an "ObjectSafe" (6, 7, 9 and 10) or "ObjectVault" (8). While under certain circumstances it is preferred that each ObjectBank System computer have its own ObjectSafe, depending on the intended use of the computer(s) or networked computer(s) on the ObjectWire Network, it is not required that each of the computers have its own object storage device because ObjectBank System computers can share an ObjectSafe with that of another ObjectBank System computer. For example, computer 2a need not have its own ObjectSafe 7 because it could use computer 2's, 3's or 3a 's ObjectSafe. Likewise, in existing network configurations 3 and 3a, individual work stations 11 and 12 do not require their own ObjectSafes, if file servers 13 and 14 include an ObjectSafe 9 and 10 or an ObjectSafe outside the network is used. Thus, if desired, all computers on the ObjectWire Network could be configured like an existing client-server configuration whereby all computers would share one computer's ObjectSafe. Computer 2b is configured such that it has an ObjectVault 8 rather than an ObjectSafe. An ObjectVault is an ObjectSafe which has been configured to store a copy of all objects on the ObjectWire Network whereas an ObjectSafe is configured by a user to store only select objects on the ObjectWire Network. Therefore, any reference herein to an ObjectSafe may interchangeably be referred also to as an ObjectVault depending on the desired user configuration. It is preferred that at least one computer on the ObjectWire Network include an ObjectVault and that this computer be physically secure 15 from access by all persons except a designated ObjectBank Manager responsible for the operation and maintenance of the ObjectVault computer.

Each ObjectSafe (6, 7, 9 and 10) and ObjectVault (8) is custom configurable. A typically envisioned configuration for each ObjectBank System's ObjectSafe disk directory would include the following subdirectories: Root Directory, DOS, Windows, Network Programs, Other Application Programs (may be accessible on the ObjectWire Network), ObjectBank Programs, ObjectSafe Configuration, ObjectTeller—User Interface, ObjectWire Network Interface, ObjectBank Work Area, ObjectBank Message Exchange Database, ObjectBank Out Box (read-only on the network), ObjectBank JobBank, ObjectBank MailBank, ObjectSafe Indexes (certain selected indexes), and ObjectSafe Objects with the following two optional subdirectories: Temporary Object File, Permanent Object File. A typically envisioned ObjectBank System ObjectVault computer disk directory would include the following subdirectories: Root Directory, DOS, Windows, Network Programs, ObjectBank Programs, ObjectVault Configuration, ObjectWire—Network Interface, ObjectBank WorkArea, ObjectBank Message Exchange Database, ObjectBank Out Box (read-only on the ObjectWire Network), ObjectVault Indexes (all objects, all object indexes), and ObjectVault Objects having the following two subdirectories: Temporary Object File and Permanent Object File.

Each ObjectBank System computer manages objects by indexing, depositing ("storing"), withdrawing ("retrieving") and communicating objects through the functions of the ObjectTeller and ObjectWire programs 4 and 5. The ObjectTeller and Object Wire programs are written in "C" language and are capable of being constructed by one skilled in the art of computer programming using standard industry routines. The ObjectTeller program 5 is a menu driven user interface program for the configuration and use of the ObjectBank System, i.e., the depositing and withdrawing of objects, and for determining the status of the deposits and withdrawals of objects. The ObjectWire program 4 is a communications program having its own configuration and function files for the posting and withdrawal of objects to and from the other ObjectBank System computers on the ObjectWire Network 1. The functions of the ObjectTeller and ObjectWire programs can be accessed directly by executing each program independently of any other program. However, the functions of the ObjectTeller and ObjectWire programs are preferably accessed and executed indirectly through an OLE aware program operating within a MicroSoft Windows operating environment. This preferred usage precludes the user from having to exit an applications program to directly access and execute the functions of the ObjectTeller and ObjectWire programs.

THE OBJECTTELLER PROGRAM

The ObjectTeller program 5 comprises functions to permit a user means for processing the deposit and withdrawal of objects to and from one or more ObjectSafes (6, 7, 9 and 10) and/or ObjectVaults (8) on the ObjectWire Network 1, and review the status of deposits and withdrawals.

Custom Configuration

Figure 2:
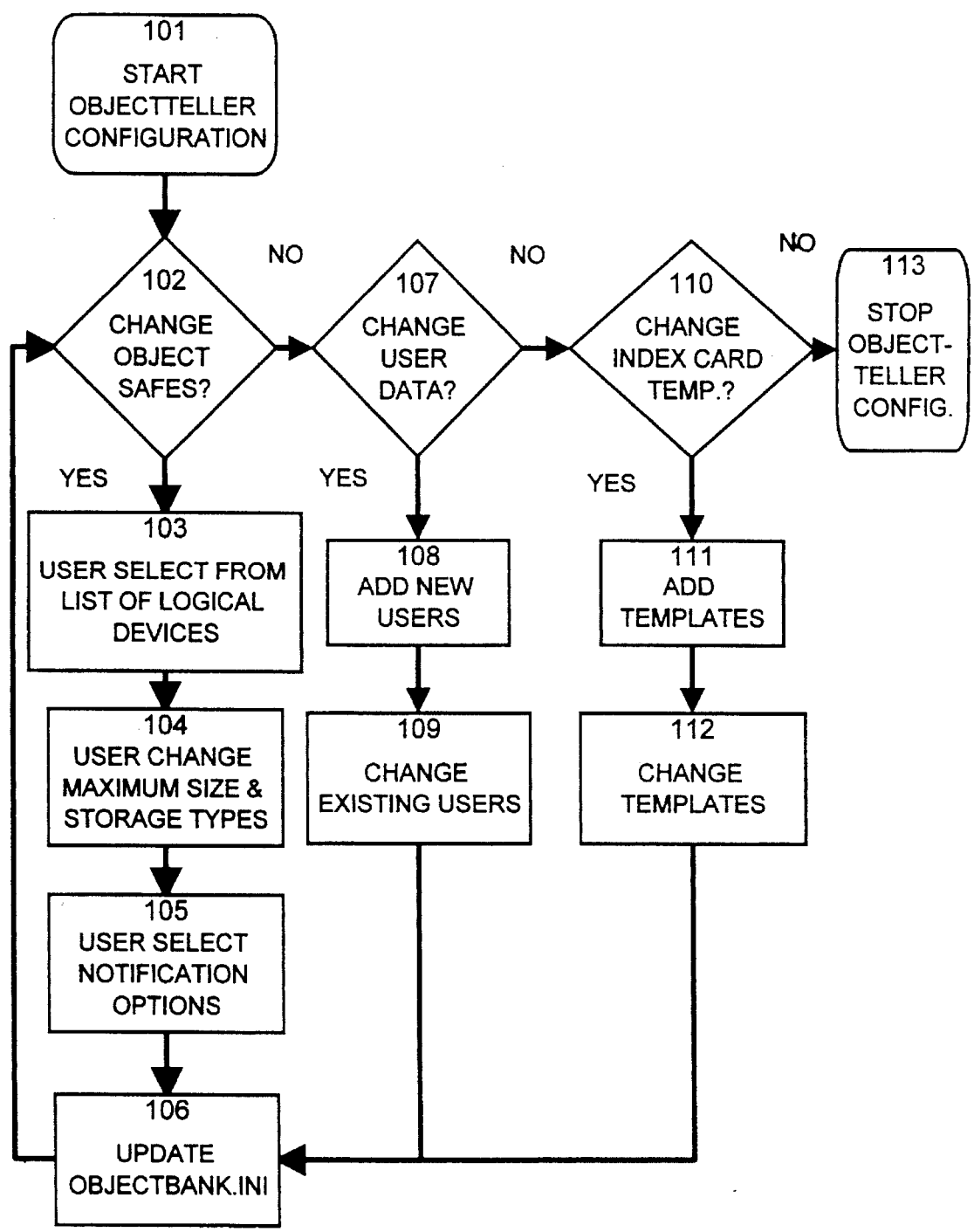
FIG. 2 is a flowchart diagram of the Configuration process routine of the ObjectTeller program of the System invention.

Referring now to FIG. 2, which is a flowchart diagram of the configuration routine 101–112 of the ObjectTeller program 5 of FIG. 1. Upon initial execution 101 and any subsequent execution of the ObjectTeller program, the ObjectTeller Configuration initialization file (ObjectTeller.ini) is read and saved in a temporary object, a local MED and ObjectSafe is opened, an array for each available ObjectVault and ObjectBank is built, and arrays for the User Data and Index Card Templates are built. If an error occurs, then the user is returned to the system.

Then, a user or ObjectBank Manager has the option to custom configure the ObjectBank System by selecting and executing various options from a menu. The configuration routine permits the user (or ObjectManager) to: (1) select and change 102 the ObjectSafe(s) and/or ObjectVaults to which objects are to be deposited to or withdrawn from (the "target" ObjectSafe or ObjectVault); (2) select and change 107 which users are authorized to deposit or withdraw objects from an ObjectSafe and what level of access each user is permitted; and, (3) select and change 110 which Index Card Template is to be used to record object information.

1. Change ObjectSafe/Object Vault

Referring further to FIG. 2, if a user (or ObjectManager) desires to select or change a target ObjectSafe (or ObjectVault), he executes from a menu the ChangeObjectSafe function 102. This causes invocation of the file "SAFE.dlg" file which includes the ObjectSafe and ObjectVault configuration information. Then, the ObjectBanks and ObjectVaults known to this ObjectTeller are listed and the current target ObjectSafe and ObjectVault are indicated. The user then selects 103 from the list of logical devices which ObjectSafe and ObjectVault is to be the current ObjectSafe and ObjectVault. The selection identifies the path to the desired target ObjectSafe or ObjectVault. Once the current target ObjectSafe and ObjectVaults are selected 103, the user can then select 104 to change the size and type of storage (i.e., ObjectSafe or ObjectVault), if desired.

To make a change, the user first selects the ObjectSafe or ObjectVault from the SAFE.ini file and then selects to remove the ObjectSafe or ObjectVault from the SAFE.ini file or to change its parameters. If removal is desired, the selected ObjectSafe or ObjectVault is removed from the SAFE.ini file. If a change is to be made, an ObjectSafe/ObjectVault maintenance form is presented and the existing safe/vault parameters are listed. The use then modifies the parameters. The parameters peculiar to the selected logical device are verified. If verified, then the user accepts or rejects the changes. If a change to the size and storage type is not desired, the user can then select 105 which other ObjectBanks systems are to be notified of object deposit and withdrawal activity. This is accomplished by selecting the target ObjectSafes and/or ObjectVaults from the SAFE.dig file. The new targets are evaluated and the pathways validated. If validated successfully, a list of the available storage and types of storage registered for the ObjectSafe are listed.

After the user completes any changes of ObjectSafes or ObjectVaults 102, selects the logical device for safe work 103, changes size or storage types 104, and/or selects the notification options 105, the ObjectBank System's configuration file database ("OBJBANK.INI"), is updated 106 to record the changes.

2. Change User Data

Referring further to FIG. 2, if a user desires to add new and/or change authorized users of the ObjectBank System, the user selects from a menu the ChangeUserData function 107, the AddNewUsers function 108 and/or selects the ChangeExistingUser function 109.

If the user selects AddNewUsers 108, a maintenance template (form) is presented for completion by the user. The user must input certain minimum information such as the new users name, user type (i.e., depositor or borrower), user description (i.e., a general comment), the unique user identification ("ID"), and the user's main storage "bank" (i.e., ObjectSafe). Additional optional information may be input, such as, type of "bank account", any co-users, correspondent banks for this user, the user generation, short name, government identification number, visibility indicator, primary operating "branch" (i.e., home directory/pathway), date account opened, and permissible activities. The completed maintenance template is then verified and either accepted or rejected by the user and upon either of which the user moves on to ChangeExistingUsers function 109.

If the user desires to change an existing user, he/she selects ChangeExistingUsers 109, which causes a list of existing current ObjectBank users to be displayed. The user selects from the list the user to be changed and that selected user's current information is displayed in a maintenance template form. The user completes the changes and either verifies or rejects the changed information.

Once the user adds any new users 108 or makes any change to the existing users 109 and the changes are verified, accepted or rejected, the ObjectBank System's configuration database file OBJBANK.INI is updated 106 to record the additions or changes.

3. Change Index Card Template

If a user desires to add new or change the Index Card Templates to which object index information will be recorded, the user selects from a menu the ChangeIndexCardTemplates function 110, then AddTemplates 111 or ChangeTemplates 112 functions.

If AddTemplates 111 is selected, a template maintenance form is presented and the user inputs certain minimum information such as the template name and class, the data type, the application type, and general usage description. Additional optional information may also be input such as the short name of the template, referenced bank accounts and the review date of the template. The added template is then verified and either accepted or rejected. If accepted, the new template is retained for subsequent updating of the OBJBANK.INI configuration file. Once the new template is either accepted or rejected, the system goes to the ChangeTemplates function 112.

If the user does not desire to change a template, the OBJBANK.INI configuration file is updated. If the user desires to change a template, the ChangeTemplates function 112 causes a list of the current bank templates to be presented. The user then selects which template is to be changed and the template with current information is displayed in standard template maintenance form. The user changes the desired information (i.e., completes the form). The information is then verified and either accepted or rejected. If accepted, a new template with the changed information is retained for updating the OBJBANK.INI configuration file. If accepted or rejected, the OBJBANK.INI file is then updated 106. Once the OBJBANK.INI file has been updated 106 and no further ObjectTeller configuration changes or additions 102, 107, or 110 are desired, the ObjectTeller configuration routine is terminated by selecting 113 an exit function (StopObjectTellerConfiguration). The user is then returned to the operating system environment from which he began prior to execution of the configuration routine.

Depositing Objects

Figure 3:
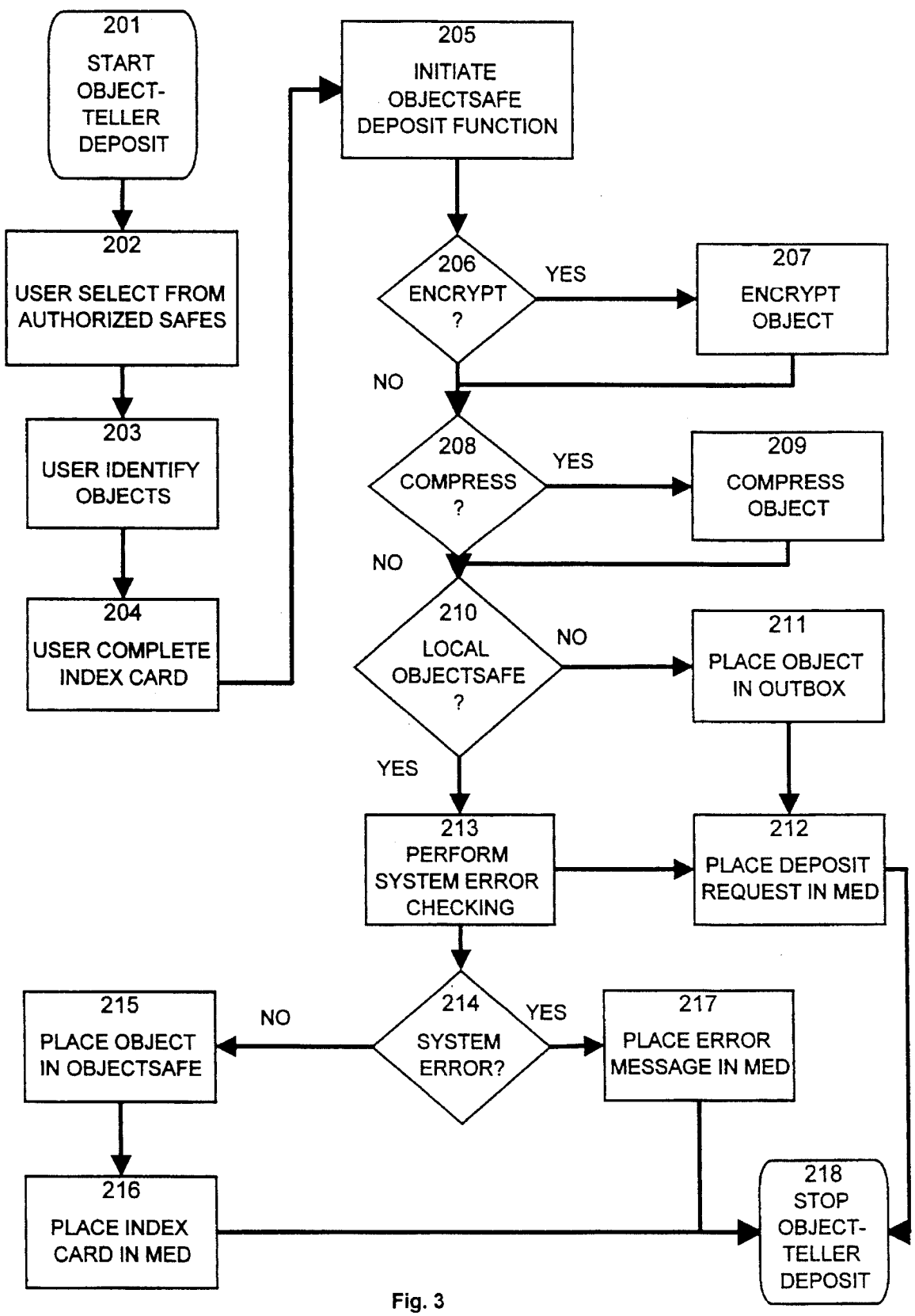
FIG. 3 is a flowchart diagram of the Deposit process routine of the ObjectTeller program of the System invention.

Referring now to FIG. 3, a flowchart diagram is shown of the ObjectTeller program deposit routine 201–218. To deposit an object in a target ObjectSafe, the user selects and executes 201 from a menu the ObjectTeller Deposit routine. Upon selection, the ObjectTeller.ini file is read and saved in a temporary object. The local Message Exchange Database (MED) and local ObjectSage are opened and arrays for the available ObjectVaults, ObjectBanks, user data, and index card templates are built. In addition, the OTdep.dlg (ObjectTeller deposit menu) file is invoked.

1. Select a Target ObjectSafe 202.

Upon selection 201 of the deposit function, the SAFE.dlg (ObjectSafe and ObjectVault configuration) file is also invoked and the ObjectSafes and ObjectVaults known to this ObjectTeller are listed and the current target ObjectSafe and ObjectVault are indicated. The user then selects 202 the target ObjectSafe from his\her own ObjectSafe (if computer resident) and/or one or more other ObjectSafes on the ObjectWire Network 1 to which he\she has been authorized access. The user can select multiple target ObjectSafes if objects are desired to be deposited in several ObjectSafes.

2. Identify the object(s) to be deposited 203.

If the user desires to deposit an object from within an OLE environment (i.e., selects a "save" function within an OLE aware applications program), the ObjectBank System reads each object and attempts to identify the type of object—WordPerfect, Dbase, Lotus, CAD, etc. If the user has not accessed the ObjectTeller functions through an OLE aware applications program, the user must identify/select the object(s) that will be deposited. The user can also select whether the object to be deposited is temporary or permanent. If no object is identified for deposit through an OLE aware application, an object identification card (template) is presented to the user for completion. The user then inputs 203 certain minimum object identification information such as the object name, object type and object location. Wildcard characters (e.g., ?, /, *) may be used. If the user does not input the object type, the ObjectTeller deposit routine will evaluate and automatically select the object type. If the user does not input the object location, a list of default paths is presented allowing the user to select between directories and drives.

3. Fill-out object Index Card 204.

Once the object identification card is completed 203, the deposit function locates the identified object and evaluates its type and verifies it against the user's indication or (if no user indication of type), the deposit function automatically identifies and classifies the type of the identified object. The ObjectTeller program creates a user index card from a default index card template for each type of object, partially completes the index card with minimum data from the object for identification and storage, then displays the index card to the user for completion 204. If the object has previously been deposited in the ObjectBank System, then a list of all the previous relative index cards is presented which identify any related object(s) (i.e., "parents, " "children" or "siblings"). The user can retrieve and look at the index cards for these parent/children/siblings objects and do an on-screen object comparison before deciding whether to continue with the depositing of the object. The user can then select and examine the various index cards and either select one for the default model or request a new index card template having the minimum identification and storage data for the object to be deposited. The user then completes 204 the index card by inputting optional information such as co-users interested in this object, the object generation, an object alias, the visibility indicator, the primary object level, object creation or reference date, cross-reference keys within the object and cross-reference keys to other objects. In addition, the user indicates by inputting a check on the index card his/her choice for object encryption, compression, password access protection and/or object deletion from the local ObjectSafe's subdirectory after deposit to the target ObjectSafe\Vault. An index card is completed for each object to be deposited.

4. Initiate Deposit Function 205.

If the user desires to continue with the deposit of the object, the ObjectSafe deposit function is initiated 205. The object index card data is placed in a structure and read to determine if the object to be deposited is to be encrypted 206 and compressed 208 before depositing. The default is to encrypt 207 and compress 209 the object before the object is deposited to a target ObjectSafe\Vault. If the object is to be encrypted 207, the object is located, its size and storage requirements evaluated, then encrypted and the storage setup. If the object is to be compressed 209, the object is located, its size and storage requirements evaluated, then compressed and storage setup.

5. Deposit object to local or non-local ObjectSafe 210.

The ObjectTeller program then determines 210 if the object is to be deposited to the local (computer resident) ObjectSafe or to a non-local ObjectSafe located elsewhere on the ObjectWire Network 1. If the object is to be deposited in a non-local ObjectSafe, then the object and related index card is located, object accounting (tracking) information added, and the object placed 211 in the Outbox for pick-up by the target ObjectSafe computer. A deposit request index card is placed 212 in the Message Exchange Database, and afterwhich, the ObjectTeller deposit routine is terminated 218.

6. Perform ObjectBank system error checking 213.

If the object is to be deposited in a local ObjectSafe\Vault, then the object is located and industry standard system error checking functions are performed 213 including checksum validation on the source and altered object form, size and storage requirement evaluation and comparison to local target storage capacity, and the system clock switch is set and results conditions checked. The ObjectTeller program reads ("copies") each object into its "work area" RAM from the source object, then calculates checksums for data validation. It compares the object in the work area to the source object checksums to verify data transmission accuracy. It also checks to make sure there is sufficient space on the target ObjectSafe for the object to be deposited, so as not to exceed the pre-configured maximum ObjectSafe storage capacity. If an error is detected 217, then an ObjectDeposit error message template is created and placed 217 in the local Message Exchange Database and the ObjectTeller Deposit routine is terminated 218.

7. Deposit the object to the target ObjectSafe 215 or indicate system error 217.

If the system error checks are successful and no error is detected 214, then the object is located, object accounting information added, and then deposited 215 from the work area RAM into the target ObjectSafe. The object index card is located in the work area RAM, object accounting information added to indicate a successful deposit location, then placed 216 in the local target ObjectSafe and in the Message Exchange Database with a public routing code ("flags") so all other ObjectSafe computers on the ObjectWire Network 1 can update their indexes. The ObjectTeller deposit routine is then terminated 218.

If the object is to be deposited in an ObjectSafe on another ObjectBank System computer on the ObjectWire Network 1, the source ObjectBank System ObjectWire program will keep polling the Message Exchange Database on the target ObjectSafe computer until a message appears that an updated index card for the deposited object appears indicating that the deposit was successful, its deposit location, and that an updated index card is available for pick up in the target ObjectSafe computer's Out Box. The updated index card is then copied from the target ObjectSafe's Out Box to the source ObjectSafe. When successfully copied, the object will be cleared from the source Out Box and an Index Updated message, cross-referenced to the object, will be placed in the source ObjectBank computer's Message Exchange Database and routed to the target ObjectSafe. When a duplicate index updated message appears in the Message Exchange Database of the source ObjectSafe computer with the source user's routing code, the target ObjectBank System will clear its Out Box of all information related to the object. If the user has indicated that the object should be moved/deposited to a Null Device, it will be deposited to the Null Device and essentially deleted from the source ObjectSafe.

Withdrawing Objects

Figure 4:
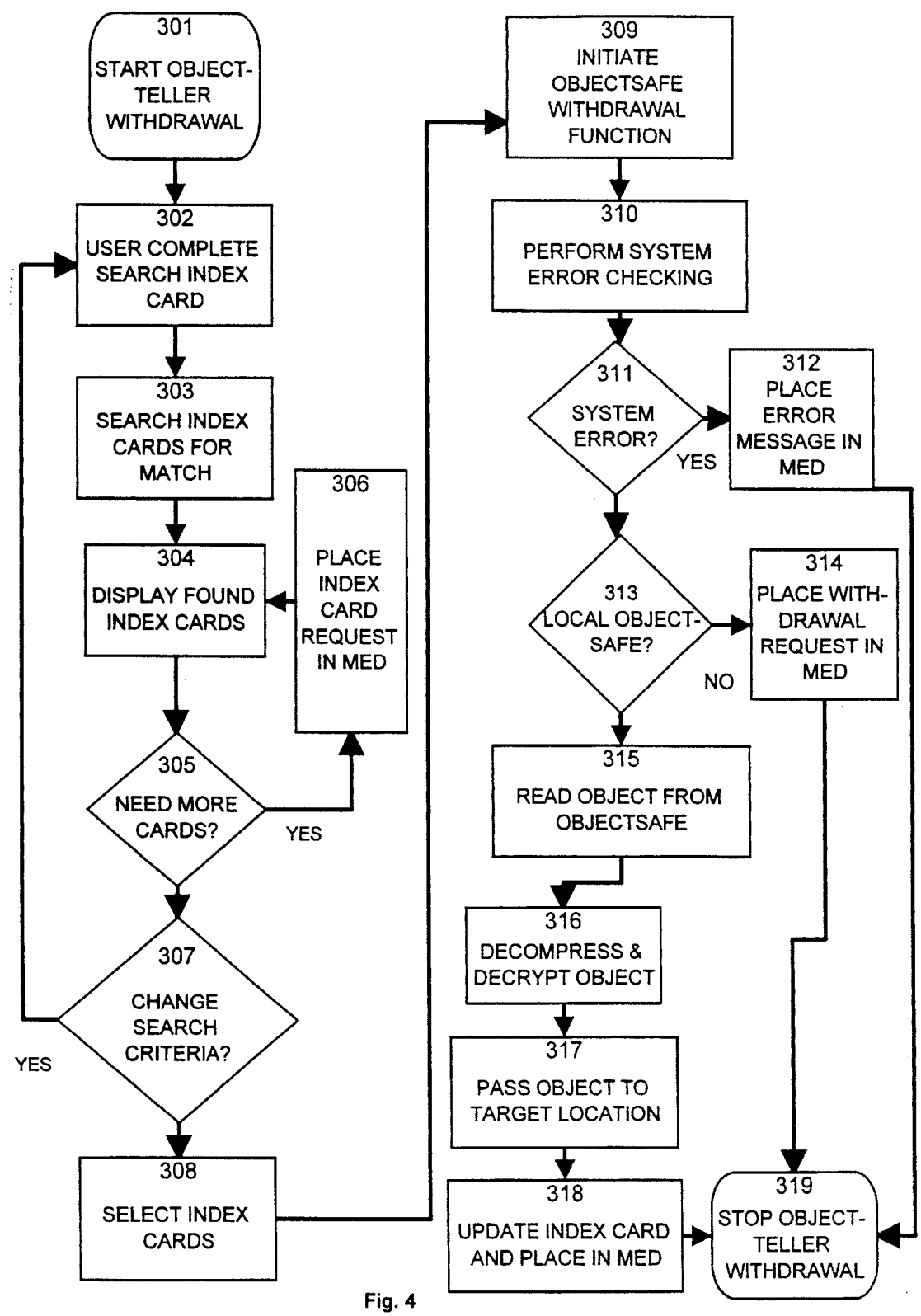
FIG. 4 is a flowchart diagram of the Withdrawal process routine of the ObjectTeller program of the System invention.

Referring now to FIG. 4, a flowchart diagram of the ObjectTeller program withdrawal routine 310–319 is shown having functions to withdraw an object from a target ObjectSafe\Vault. A user withdraws objects by selecting and executing from a menu the ObjectTeller withdrawal routine 301. This causes the ObjectTeller.ini file to be read and saved in a temporary object. The local Message Exchange Database and local ObjectSafe are opened and arrays for the available ObjectSafes and ObjectVaults, user data, and index card templates are built.

1. Complete Search Index Card for object index card search 302.

The first step in the withdrawal of an object from the ObjectBank System is to first identify the object and its location by conducting an object index card search. When executing the ObjectTeller withdrawal process routine 301, the ObjectTeller program invokes the Sindex.dlg file which displays a search index card having blank fields to be completed 302 by the user. The user then completes the fields which designates which ObjectSafes are to be searched and what object and/or type of object index card is to withdrawn from the designated target ObjectSafes. The more search criteria input on the Search Index Card, the more inclusive and narrower the search for a particular object or type of object Index Card. If the user cannot type entries in the search fields, then clicking upon the fields causes a list to be presented showing available selections for the selected search criteria.

Once the search criteria is input/selected 302, the ObjectTeller withdrawal routine parses the completed search fields and sets up a search criteria database. A fuzzy search of the index cards of the designated local ObjectSafe is then performed 303 matching the Search Index Card to the desired object(s) index card. The matching index cards are collected in an array and displayed 304 in a list format for review by the user. The ObjectBank System reports how many index cards have been found with an exact match and how many with a "fuzzy" match. If a matching index card has not been found in the local Objectsafe(s) (e.g., as a result of the object being deposited to an ObjectVault and removed from the local ObjectSafe in order to save disk space) and a search of additional Index Cards is desired 305, then the user can request a withdrawal of object index card(s) from an ObjectVault and/or other ObjectSafes on the ObjectWire Network 1 and an index card withdrawal request will be placed in the Message Exchange Database 306. The user is allowed to select for searching other ObjectSafes on the ObjectWire Network to which he has been authorized access. The user can select multiple target ObjectSafes if the desired object(s) may have been deposited in several Object-Safes on the ObjectWire Network. Any additional found index cards returned by the request will be displayed 304 in the list format for review by the user. If the user determines he has not found the desired object(s), he can change 307 the search criteria and fill-out another Search Index Card and another object index card search process can be performed 303 and the results of the search displayed 304.

2. Select the index card of the object to be withdrawn 308.

To view an index card of the object to be withdrawn, the user selects 308 the desired index card from the displayed list. By selecting 308 the index card to be viewed, the ObjectTeller withdrawal routine parses the ObjectBank account, type and location data so the user can see the detail of the index card, including information on the genealogy and pathway of who has deposited and who has withdrawn the object. The user can also look at the index cards for the parents/children/siblings before deciding whether to continue.

3. Initiate the withdrawal function 309.

To withdraw one or more objects identified on the index cards, the user initiates the ObjectSafe withdrawal function by selecting 309 the desired object to be withdrawn. This causes the index card data to be placed in the search structure. It should be noted that if the user is not accessing the ObjectTeller program through an OLE environment, the user must indicate to which drive, directory, and filename the object will be copied (withdrawn to). If nothing is entered, then a directory display will appear allowing the user to highlight certain drives and directories. If the user is retrieving temporary information, he has the option of indicating that the information should be deleted from the source ObjectSafe after successful withdrawal into the work area RAM.

4. Perform system error checking 310.

Once the ObjectSafe withdrawal function is initiated 309, the object size is determined and formed in an index structure and System error checking is performed 310 evaluating the required size and storage and comparing it to the local target ObjectSafe\Vault capacity so as not to exceed the pre-configured maximum storage capacity. If an error is detected 311, an ObjectWithdrawal error message is created and placed 312 in the Message Exchange Database and the ObjectTeller withdrawal routine is terminated 319.

5. Determine locality of object to be withdrawn 313.

If no System error is detected 311, the ObjectTeller program determines if the object(s) to be withdrawn are to come from a local ObjectSafe or an non-local ObjectSafe 313.

If the withdrawal is to be made from a non-local Object-Safe (i.e., an other ObjectBank System having an Object-Safe or ObjectVault) a withdrawal request with the correspondent information and flags to alert the target ObjectSafe (object "source" ObjectSafe) is placed in the Message Exchange Database 314. The ObjectTeller withdrawal routine is then terminated 319 and the ObjectWire program polling routine will begin cyclically polling the target ObjectSafe(s) Message Exchange Database to detect when the desired object is ready to be picked-up from the target ObjectBank computer's Out Box 601 (see FIG. 7).

6. Withdraw object from local ObjectSafe 315.

If it is determined 313 that the withdrawal is to be made from a local ObjectSafe, the object is located in the local ObjectSafe and read ("copied") 315 into the local work area RAM. If necessary, the withdrawn object is decompressed and decrypted 316.

The withdrawn object is then located in the local work area RAM, the target location where the object is to be deposited is verified, and the copy of the object deposited in accordance with the deposit function 205 (see FIG. 3) to the target ObjectSafe\Vault.

The index card for the object withdrawn is then updated with the accounting and time information and placed 318 in the Message Exchange Database for pick-up and notification of the source ObjectSafe computer and update of it's object index card that the transaction was completed. Once the index card of the source ObjectSafe is updated and a message placed in the Message Exchange Database, the ObjectTeller withdrawal routine is terminated 319. It should be noted that if the withdrawal is made from a non-local ObjectSafe, then an Updated Index Card message will be placed in the source ObjectBank Message Exchange Database indicating that the source ObjectBank's index card has been updated and the Out Box cleared. When the requesting ObjectBank computer's ObjectWire program detects the Updated Index Card message, it will clear its Message Exchange Database with regard to that withdrawal transaction.

Checking the Status of Deposits and Withdrawals

Figure 5:
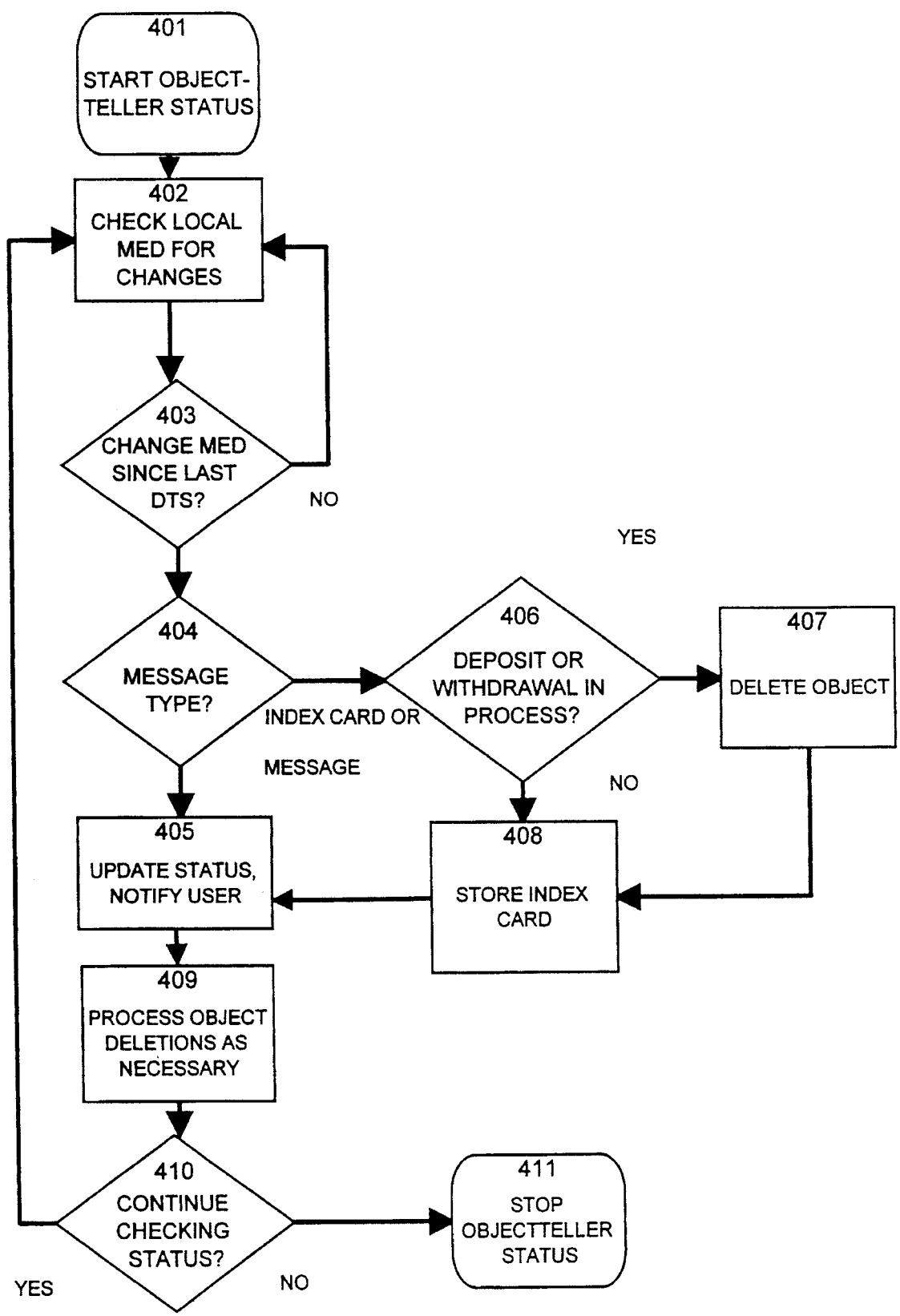
FIG. 5 is a flowchart diagram of the Status process routine of the ObjectTeller program of the System invention.

FIG. 5 is a flowchart diagram of the ObjectTeller program's Status process routine 401–411 having functions to allow the user to review the status of object deposits and withdrawals and to terminate in-process deposits and withdrawals, if desired.

Referring now to FIG. 5, to determine the status of withdraw or deposit or to terminate a withdrawal or deposit, a user selects 401 from a menu the ObjectTeller Status process routine. This causes the ObjectTeller.ini file to be read and saved in a temporary object. In addition, the local Message Exchange Database is opened.

The local Message Exchange Database is checked 402 for any changes, i.e., whether or not a new message has been added or an old message has been deleted since the last recorded date-time-stamp. Each time the Message Exchange Database is checked, a date-time-stamp ("DTS") is recorded and the last DTS is read for access checking. A "DTSKEY" is used to access the Message Exchange Database messages. If no change is detected 403 since the last DTS, the Status function continues to check the local Message Exchange Database until a change is detected. Once a change is detected 403, a new DTSKEY will be stored and the type of message change (i.e., index card or deposit or withdrawal request message) is determined 404.

If the change is an index card message or a deposit or withdrawal request message, an acknowledgement flag is checked 406 to determine if the request is still in process. If acknowledged, the deposit or withdrawal request is complete and the object deleted 407 from the Message Exchange Database, the index card is stored 408 in the Message Exchange Database, and a handling message is setup and presented 405 to notify the user of the present status. If not acknowledged, the request is still in process and the index card is stored 408 in the Message Exchange Database and a handling status message is setup and the user presented 405 with the present status.

If the message determined 404 is not an index card or deposit or withdraw request, an error message is created and the handling status message is setup and presented 405 to the user.

Once the user has been notified of the present status 405, obsolete messages can then be removed from the Message Exchange Database 409 (as necessary) and stored in the local Objectsafe and a user notification list setup. If the user desires to continue checking the status of deposits and withdrawals, the local Message Exchange Database is polled 410 for changes as before. If the user does not desire to continue checking the status of deposits and withdrawals, the Status function is terminated 411.

THE OBJECTWIRE PROGRAM

The ObjectWire program 4 (FIG. 1) comprises functions to permit a user to communicate between two or more ObjectBank Systems (e.g., 2, 2a, 2b, 3, and 3a) to process the deposit and withdrawal of objects to and from one or more ObjectSafes (6, 7, 9 and 10) and/or ObjectVaults (8) on the ObjectWire Network 1.

Configuration

Figure 6:
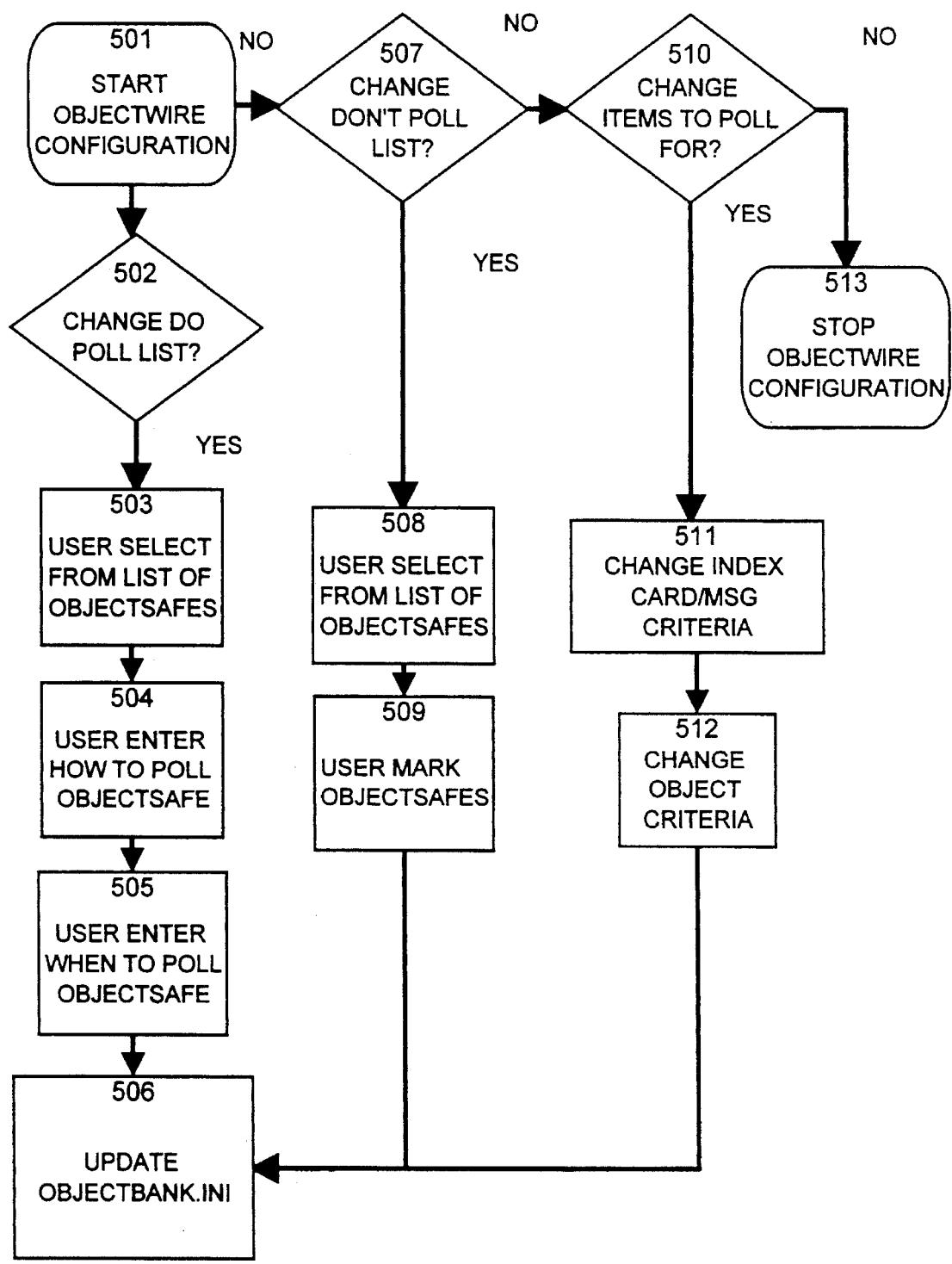
FIG. 6 is a flowchart diagram of the Configuration process routine of the ObjectWise program of the System invention.

FIG. 6 is a flowchart diagram of the ObjectWire program configuration routine 501–513. The ObjectWire configuration routine permits the user to custom configure at any time which ObjectBank Systems (ObjectSafes) on the ObjectWire Network are to be polled 502, which ObjectBank Systems are not to be polled 507, how the ObjectBank System to be polled is accessed 504, when the selected ObjectBank Systems are to be polled 505, and also to change the criteria of the objects (Index Card, Index Card Message or Object) to be polled 510.

The ObjectWire Configuration routine is accessed and executed by way of menu selection via the ObjectTeller program 5 (FIG. 1). Upon the execution of the ObjectWire configuration routine 501, the ObjectTeller.ini file is read and saved in a temporary object, the local Message Exchange Database and local ObjectSafe are opened, and arrays for the available ObjectSafes and ObjectVaults, user data, and index card templates are built. In addition, the "Ow.dlg" (ObjectWire configuration menu) file is invoked.

The user has the option of menu selecting the ObjectSafes to be polled 502, to select those ObjectSafes which are not to be polled 507 and to change the item (i.e., index card, message and/or object) criteria to be polled 510.

If the user selects the ObjectSafe(s) to be polled list (Change Do Poll List) 502, the SAFE.dlg file is invoked and the ObjectSafes and ObjectVaults known to this ObjectTeller are listed and the current target ObjectSafe and ObjectVault indicated. The user then selects 503 from the list those ObjectSafes to which the user is permitted access.

After an ObjectSafe is selected 503 to be polled, the "SAFENAV.dlg" (ObjectSafe navigation information) file is invoked and the user inputs 504 the manner (i.e., pathway and procedure: address/telephone, number/password, etc.) by which the target ObjectSafe is to be accessed. Once the user inputs 504 how the target ObjectSafe can be accessed, the user inputs 505 the time interval upon which the target ObjectSafe is to be polled or accepts the default (ObjectTeller.ini) interval. When the user has completed selecting 503 the target Objectsafe(s) to be polled and inputting how 504 and when 505 the target ObjectSafe(s) are to be polled, the ObjectWire configuration database file OBJBANK.INI is updated 506. The user is then returned to the beginning of the same option of whether or not to change the ObjectSafe polling list 502.

If the user no longer desires to change 502 the ObjectSafe polling list, then the user has the option of selecting 507 from a menu those ObjectSafes that are not to be polled 507. If the user selects 507 to change the ObjectSafes not to be polled, then the SAFE.dlg file is invoked, the ObjectSafes and ObjectVaults known to this ObjectTeller are listed and the current ObjectSafe and ObjectVaults are indicated. The user then selects 508 from the list the desired ObjectSafes\Vaults that are not to be polled. The SAFENAV.dlg (ObjectSafe navigation information) file is invoked and the user marks 509 those ObjectSafes\Vaults as "NOTPOLL." After the ObjectSafes are marked 509, the ObjectWire configuration database file OBJBANK.INI is updated 506. The user is then returned to the beginning of the option of whether to change the ObjectSafe polling list 502; if not, then to the change the do not poll list; and, if not, then the user has the option of changing 510 the items to be polled.

If the user chooses the menu option to change 510 the items to be polled, the user is presented with a list of polling items, i.e., the user can select 511 the index card or message criteria to change. The selection tabs on/off an index card/message awareness switch. Once the desired item criteria has been changed 511, the user is presented with a polling object list from which he/she can select to change 512 the object or type of object criteria to be polled. In addition, the user can also enter a new object type to be included in the polling criteria. Once the user selects 512 the object criteria to be changed and/or enters the new object type to be included in the polling criteria, the Objectwire configuration database file is updated 506. The user is then returned to the beginning of the option of whether to change the ObjectSafe polling list 502; if not, then to the change the do not poll list; if not, then the user has the option of changing 510 the items to be polled; if not, then the ObjectWire configuration routine is terminated 513. The user returns to the ObjectTeller program 5 (FIG. 1) menu operating environment.

Polling

Figure 7:
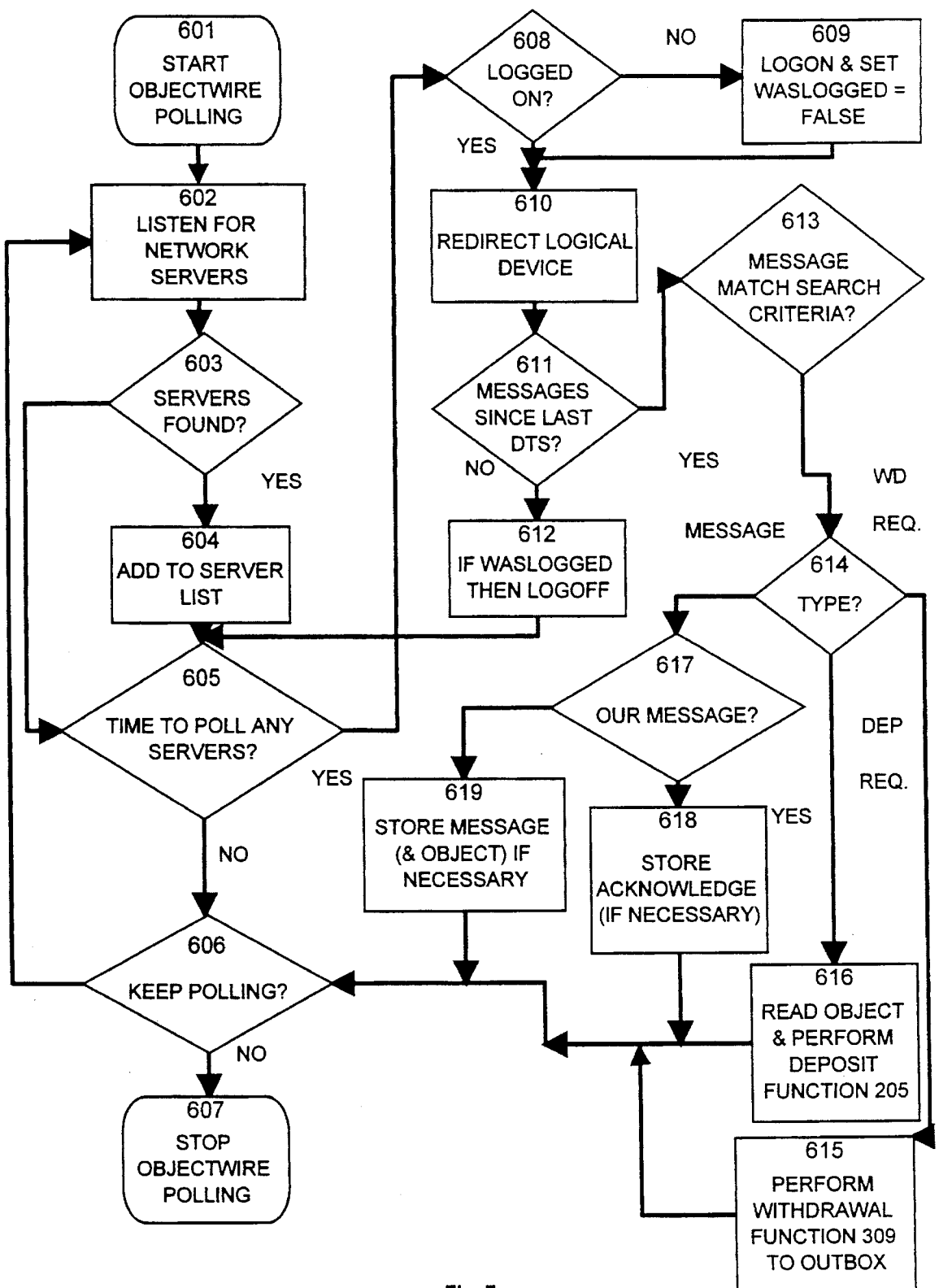
FIG. 7 is a flowchart diagram of the Polling process routine of the ObjectWire program of the System invention.

FIG. 7 is a flowchart diagram of the ObjectWire program polling routine 601–615. The ObjectWire program polling routine operates continuously in the background in a Microsoft Windows® type OLE operating environment and is also manually executable by menu selection via the ObjectTeller program 5 (FIG. 1). Upon execution 602, the ObjectTeller.ini file is read and saved in a temporary object, calls are made for available servers on each adapter installed in the ObjectBank System and then listens for broadcast signatures of network servers. If a server is found 603, the OBJBANK.INI database file is updated 604 with the server information (pathway, telephone number, password, etc.) and the server is added to the presently available polling list.

Then, as configured by the ObjectWire Configuration routine 501, the ObjectWire Polling routine cyclically polls 605 target ObjectBank Systems (servers) at a given time. Each time an ObjectBank System is polled, a date-time-stamp ("DTS") is recorded. If it is not time to poll 605 a given target ObjectBank System, a user has the option of having the ObjectWire polling routine continue polling 606 and listen 602 for Network servers or the polling routine can be terminated 607 and the user returned to the menu operating environment of the ObjectTeller program 5 (FIG. 1). If it is time to poll 605 a given target ObjectSafe System, the ObjectWire polling routine will check 608 to see if the Objectbank System is "logged-on" to the target Objectbank System. If the ObjectWire Polling routine detects 608 that the Objectbank System was logged-on, then the logical device is redirected 610 to the target ObjectBank System's ObjectSafe (server) location, the last DTS for this server is read and the Message Exchange Database is opened for this server. If the Objectbank System was not logged on 608, the ObjectWire Polling program will log-on 609 to the target ObjectBank System, set 609 a flag called "WasLogged" to equal "false," set a flag called "LogOn" to equal "yes," and then redirect 610 the logical device to the target ObjectSafe. Once the logical device has been redirected 610, the ObjectWire polling routine determines 611 if there are any messages put in the Message Exchange Database since the last DTS. If there are no messages since the last DTS and the "WasLogged" flag is set to "false," then the ObjectWire Polling routine logs-off 612 the server and sets the LoggedOn flag equal to "no." The ObjectWire Polling routine returns to the polling process at step 605 (Time to Poll any Servers). If there is one or more messages since the last DTS 611, then the ObjectWire Polling routine determines 613 if any message matches the search criteria as set during the ObjectWire Configuration process 501–513 and what type 614 each message is, i.e., a withdrawal request, deposit request or index card message. If the message is a withdrawal request, the ObjectTeller withdrawal routine function (309) is performed 615 to the Outbox and the ObjectWire polling routine continues 606. If the message is a deposit request, the object is read and the ObjectTeller deposit function (205) is performed 616 and the ObjectWire polling routine continues 606. If the message is an index card message, then it is determined 617 whether or not the message is one that originated from this ObjectBank System 617. If yes, i.e., it is a message originating from the local ObjectBank, then it is an acknowledgment of a deposit or withdrawal request and it is read and stored 618 in the local Message Exchange Database for further processing, and the ObjectWire Polling routine continues 606. If the message did not originate from this ObjectBank System, then the message is read and stored 619 in the local Message Exchange Database for further processing. If an object is associated with the message and the object is in the ObjectBank System's read area, the object is read and stored in the temporary storage area of the ObjectSafe, and the ObjectWire Polling routine continues 606 until terminated 607.

Withdrawal

Figure 8:
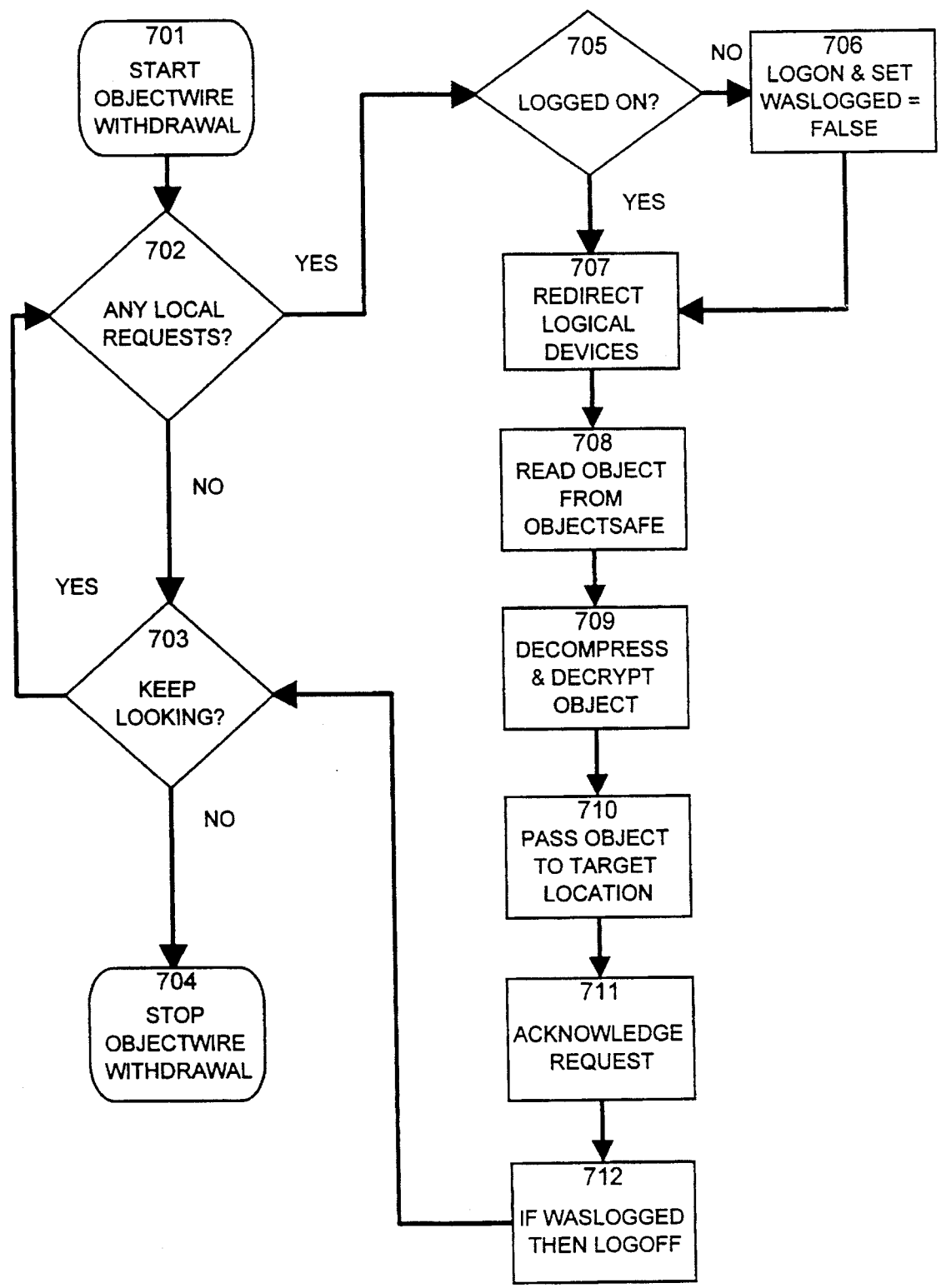
FIG. 8 is a flowchart diagram of the Withdrawal process routine of the ObjectWire program of the System invention.

FIG. 8 is a flowchart diagram of the ObjectWire program Withdrawal routine 701–704. The ObjectWire program withdrawal routine operates 701 continuously in the background in an OLE operating environment and is also manually executable by menu selection via the ObjectTeller program 5 (FIG. 1). The ObjectWire withdrawal routine looks 702 for any withdrawal or index card requests in the local Message Exchange Database. If none are found, the user has the option 703 of continuing to look 702 for local withdrawal or index card requests or terminate 704 the ObjectWire withdrawal routine which returns the user to the operating menu environment of the ObjectTeller program 5 (FIG. 1). If a withdrawal or index card request is found 702 in the local Message Exchange Database, then the ObjectWire withdrawal routine will check 705 to see if the Objectbank System is logged-on to the source Objectbank System. If the ObjectWire Withdrawal routine detects 705 that the Objectbank System was logged-on, then the logical device is redirected 707 to the source ObjectBank System's ObjectSafe. If the Objectbank System was not logged-on 705, the ObjectWire Withdrawal routine will log-on to the source ObjectBank System server, set 706 the "WasLogged" flag to equal false, set the "LogOn" flag to equal "yes," redirect 707 the logical device to the source ObjectSafe (server) location, and then open the ObjectSafe on this server. Once the logical device has been redirected and the ObjectSafe opened 707, the ObjectWire withdrawal routine locates the object size and form in the index structure, evaluates its size and storage required and compares it to the local target capacity. If ok, the object is located in the corresponding source ObjectSafe OutBox and read ("withdrawn" or "copied") into the local work area RAM 708. The object is then located in the local work area RAM and decompressed and decrypted 709, if necessary. Then object is again located in the local work area RAM, the target ObjectSafe location verified, and the object copied 710 to the target location. After the object has been copied 710 to the target location, the withdrawal is acknowledged 711 by placing an Updated Index Card in the Message Exchange Database with the accounting and time information. After the withdrawal has been acknowledged 711, if the "WasLogged" flag is equal to "false," then the ObjectWire withdrawal routine causes the System to logoff 712 the server, set "LogOn" to equal "no," and return to the option 703 of whether or not to keep looking for local withdrawal or index card requests 702 or to terminate 704 the ObjectWire Withdrawal routine.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification, if need be.

We claim:

1. A highly secure, virus resistant, tamper resistant, object oriented, data processing system for depositing, withdrawing and communicating electronic data between one or more individual and/or networked computers comprising in operative combination:

a) at least one computer means for processing electronic data;

b) at least one of said computer means including at least one shared electronic storage means for temporary or permanent storage of said electronic data, said temporary storage is accessible via an OLE-aware application program to deposit and withdraw temporarily stored objects, said temporarily stored objects used to communicate requests that a permanent object be stored into or retrieved from said shared electronic storage means;

c) each of said computer means including user customizable OLE-aware and OLE-accessible objectteller program means for asynchronous deposition, withdrawal and communication of said electronic data to said shared electronic storage means;

d) each of said computer means having at least one or more of said shared electronic storage means, an objectteller program means and an objectwire program means, said objectwire program means functioning to permit customizing communications functions from other individual or networked computers,
   i) said computer means, electronic storage means ojectwire program means, objectteller program means and object wire program means providing an objectbank system,
   ii) said network of object bank systems providing an objectbank network;
e) a customizable and modifiable electronic index data file of every object in the objectbank system permanently stored in said electronic storage means to provide a record of all objectbank system transactions to facilitate deposit, withdrawal and communication audits and to identify the address of objects to facilitate retrieval of objects from an electronic storage means;
f) said electronic data is deposited, withdrawn and communicated by at least one of the objectteller and the objectwire program means by providing a copy of said data on said system, said copy ensuring that the electronic data on said storage means is not corrupted by altered electronic data or by the introduction of a computer virus;
g) said copy of electronic data is sent to said computer means by one of said storage means in response to a request being posted by said computer means in a temporary data storage area with said temporary data storage area periodically being polled to identify the presence of said request and, if present, said request being communicated to said storage means;
h) said electronic data is identified by a time object such that each of said electronic data is unique by virtue of having a unique time stamp associated with each of said electronic data, said time stamp corresponding to the time of acceptance of said electronic, data in said storage means; and
i) said time object permitting audit trails of each of said electronic data and permitting the coexistence of redundant electronic data in at least one of said storage means.

2. An object oriented data processing system as in claim 1, wherein:
said program means includes means for custom installation and configuration of said storage means and said program means to said system.

3. An object oriented data processing system as in claim 2 wherein:
said program means also includes means for archival, accountability, security, encryption and decryption, compression and decompression, and multi-processing of said electronic data.

4. In a computer system comprising one or more individual or networked computers, each of said computers including an object oriented user interface program, an object oriented communications program, and at least one of said computers having an electronic data storage means having a plurality of specifiable regions, a method for peer to peer depositing, withdrawing and communication of electronic data between said one or more individual or networked computers comprising, in any appropriate sequence, the steps of:
a) asynchronously depositing electronic data to said data storage means, said asynchronous depositing step including the steps of:
   i) selecting one or more of said data storage means to which said data is to be deposited;
   ii) identifying the data to be deposited into said selected data storage as either temporary data or permanent data;
   iii) creating a corresponding electronic data index and inputting to said data index reference information of said data to be deposited;
   iv) determining the location of said selected data storage means to which said data is to be deposited;
   v) storing said data into said data storage means at said determined location;
   vi) updating said data index with further reference information about said deposited data, said further information including time stamp information;
   vii) storing said updated data index in a first specified region of said data storage means for communication between said computers;
b) asynchronously withdrawing electronic data from said data storage means, said asynchronous withdrawing comprising the steps of:
   i) completing a second corresponding electronic data index card with reference information recorded thereon to be used in the conduct of a comparison search of said storage means for said first electronic data index cards having matching reference information to said electronic data to be withdrawn;
   ii) conducting said comparison search to determine if any said matching reference information matches to said completed second data index card;
   iii) displaying said first data index cards having said matching reference information to said completed second data index card;
   iv) selecting any of said displayed first data index cards identifying the data to be withdrawn;
   v) determining the Storage location of said selected data index cards to be withdrawn and the location from which said identified data is to be withdrawn;
   vi) withdrawing from said determined location said identified data to random access memory of said computer system; and
c) asynchronously communicating between said computers said data to be deposited and withdrawn from said data storage means using said deposit and withdrawal routines.

5. A method as in claim 4, wherein said deposit routine includes, in any appropriate sequence, the steps of:
a) storing said data to be deposited to a second specified region for communication between said computers using said communications routine; and
b) detecting a second updated data index indicating the data to be deposited has been successfully deposited to said selected data storage means.

6. A method as in claim 4 wherein said deposit routine includes, in any appropriate sequence, the steps of:
a) encrypting said data to be deposited; and
b) compressing said data to be deposited.

7. A method as in claim 6 wherein said deposit routine includes, in any appropriate sequence, the steps of:
a) performing system error checks prior in time to the depositing of said data to said data storage means; and
b) generating and storing any error message resulting from said system error checks in said first specified region of said storage means for communication to said plurality of computers.

8. A method as in claim 4 wherein said withdrawal function includes the step of placing a withdrawal request message in said second specified region for communication to any of said plurality of computers using said communications routine.

9. A method as in claim 8 wherein said withdrawal function includes, in any appropriate sequence, the steps of:
   a) performing said system error checks subsequent in time to said withdrawal of said electronic data to said random access memory; and
   b) generating and storing any error message resulting from said system error checks in said first specified region of said data storage means for the communication of any said error message to said system and any of said plurality of computers.

10. A method as in claim 9 wherein said withdrawal function includes, in any appropriate sequence, the steps of:
   a) updating said first index card with information about said data withdrawn from said data storage means; and
   b) storing said updated first data index card in said second specified region of said data storage means for communication to said plurality of computers by use of said communications routine.

11. A method as in claim 4 wherein said withdrawal function includes, in any appropriate sequence, the steps of:
   a) decompressing said withdrawn electronic data; and
   b) decrypting said withdrawn electronic data.

12. A method as is claim 4 which includes, in any appropriate sequence, using a status routine for checking and displaying the process state of said deposits, withdrawals and communications of said data.

13. A method as in claim 12 whereby said status routine includes, in any appropriate sequence, the steps of:
   a) recording a date-time-stamp to said first region;
   b) checking said first specified region for data recorded to said first region subsequent in time to said date-time-stamp;
   c) determining the type of any of said changes;
   d) determining if any of said determined types are still in process;
   e) deleting said types that are still in process;
   f) storing said data index card of types still in process in said first specified region; and
   g) updating said data index card with the present status and displaying said status.

14. A method as in claim 4 including, in any appropriate sequence, the step of using a configuration routine having functions to custom configure said communications routine for selecting which of said computers are to be communicated with and how said computers are to communicate, for selecting which computers are not to be communicated with, and for selecting the criteria of the data to be communicated between said computers.

15. A method as in claim 14, wherein said configuration routine includes, in any appropriate sequence, the steps of:
   a) determining and displaying a list of said computers available for communication with said system;
   b) selecting from said list the computers to be communicated with said system;
   c) inputting a cyclical time interval with which communication between said selected computers shall occur; and
   d) recording to a configuration file for subsequent use by said system said selected computers and input time interval.

16. A method as in claim 15, wherein said configuration routine includes, in any appropriate sequence, the steps of:
   a) determining and displaying a list of said computers not available for communication with said system; and
   b) selecting from said list the computers not to be communicated with by said system.

17. A method as in claim 16, wherein said configuration routine includes, in any appropriate sequence, the steps of:
   a) determining and displaying criteria to be communicated between said computers; and
   b) inputting changes to said criteria.

18. A method as in claim 4 wherein said communications routine includes, in any appropriate sequence, the steps of:
   a) listening for the initiation of communications from any of said computers and adding the logical path of said computers initiating said communications;
   b) cyclically initiating communications between said computers;
   c) directing a logical device to said computers with which said communications have been initiated;
   d) determining the existence of messages subsequent in time to the last recorded of said communications between said computers;
   e) determining which of said messages includes matching data;
   f) determining the type of said messages having said matching data;
   g) performing said deposit or withdrawal routines, or reading and recording said messages to said storage means, according to said type of said messages.

19. A method as in claim 4 wherein said communications routine includes, in any appropriate sequence, the steps of:
   a) cyclically determining the existence in said storage means of any request messages from any of said computers;
   b) initiating communications with said computers from which any of said request messages originated;
   c) directing a logical device to said computers;
   d) reading data from said computers; and
   e) copying said data to said storage means.

20. A method as in claim 19 wherein said communications routine includes, in any appropriate sequence, the steps of decompressing and decrypting said read data.

21. A method as in claim 20 wherein said communications routine includes, in any appropriate sequence, the step of acknowledging the completion of said copying of said data to said storage means.

* * * * *